United States Patent
Kim et al.

(10) Patent No.: US 11,523,278 B2
(45) Date of Patent: Dec. 6, 2022

(54) METHOD FOR SECURED COMMUNICATION AND APPARATUS THEREFOR

(71) Applicant: LG ELECTRONICS INC., Seoul (KR)

(72) Inventors: Soyoung Kim, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 16/956,837

(22) PCT Filed: Dec. 21, 2017

(86) PCT No.: PCT/KR2017/015208
§ 371 (c)(1),
(2) Date: Jun. 22, 2020

(87) PCT Pub. No.: WO2019/124587
PCT Pub. Date: Jun. 27, 2019

(65) Prior Publication Data
US 2020/0336908 A1    Oct. 22, 2020

(51) Int. Cl.
*H04W 12/069*    (2021.01)
*H04W 4/40*    (2018.01)
(Continued)

(52) U.S. Cl.
CPC .......... *H04W 12/069* (2021.01); *H04W 4/40* (2018.02); *H04W 12/033* (2021.01); *H04W 12/062* (2021.01)

(58) Field of Classification Search
CPC .............................. H04W 12/069; H04W 4/40
(Continued)

(56) References Cited

U.S. PATENT DOCUMENTS

2011/0060524 A1    3/2011    Miyajima
2016/0112206 A1*    4/2016    Cizas ................... H04L 9/3268
    713/158
(Continued)

FOREIGN PATENT DOCUMENTS

DE    102015114285    3/2017
KR    1020160038091    4/2016
(Continued)

OTHER PUBLICATIONS

PCT International Application No. PCT/KR2017/015208, International Search Report dated Sep. 6, 2018, 4 pages.

*Primary Examiner* — Bryan F Wright
(74) *Attorney, Agent, or Firm* — Lee Hong Degerman Kang Waimey

(57) ABSTRACT

A secured communication method for a V2X communication device is disclosed. The secured communication method for a V2X communication device comprises the steps of; receiving at least one message on the basis of V2X communication; extracting adaptive certificate pre-distribution (ACPD) target information when the at least one message includes the ACPD target information; pre-authenticating at least one short-term certificate acquired from the ACPD target information; collecting at least one pre-authenticated short-term certificate to be broadcasted at a specific predicted time at a specific predicted location; and broadcasting an ACPD group (ACPDG) message including the collected at least one pre-authenticated short-term certificate at the specific predicted location at the specific predicted time.

14 Claims, 27 Drawing Sheets

(51) Int. Cl.
*H04W 12/033* (2021.01)
*H04W 12/062* (2021.01)

(58) Field of Classification Search
USPC .......................................................... 726/26
See application file for complete search history.

(56) References Cited

U.S. PATENT DOCUMENTS

2017/0034867 A1* 2/2017 Oshida ............... H04W 72/0446
2018/0053411 A1* 2/2018 Wieskamp ............... G08G 1/09
2019/0096144 A1* 3/2019 Noh ...................... H04W 12/66

FOREIGN PATENT DOCUMENTS

KR          101701912       2/2017
WO          2016209197      12/2016

* cited by examiner

[Fig. 1]
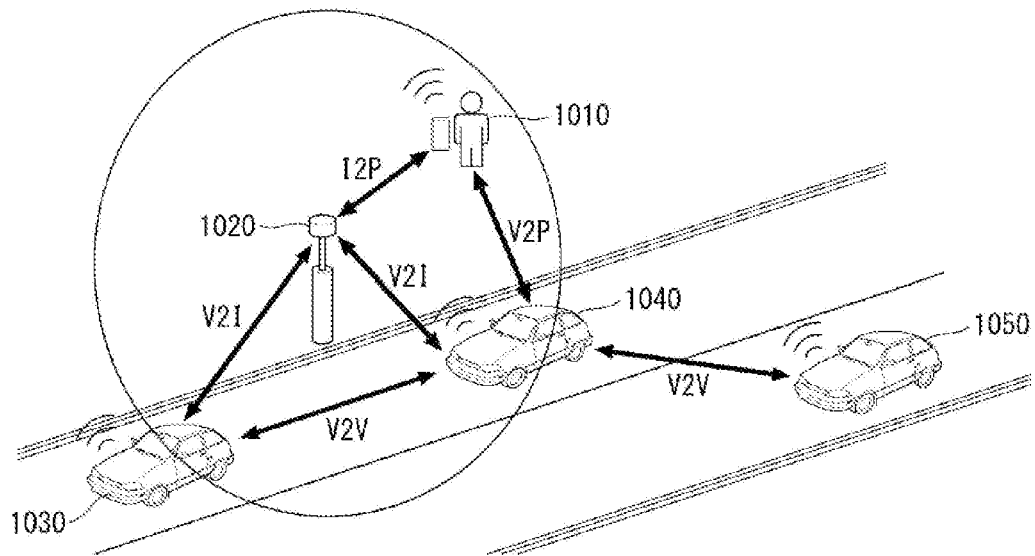
[Fig. 2]
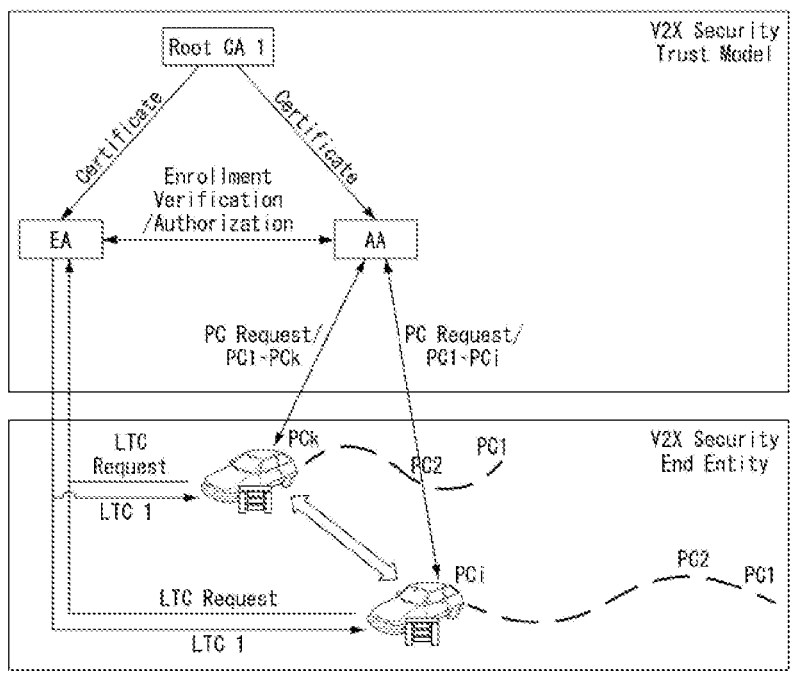

[Fig. 3]
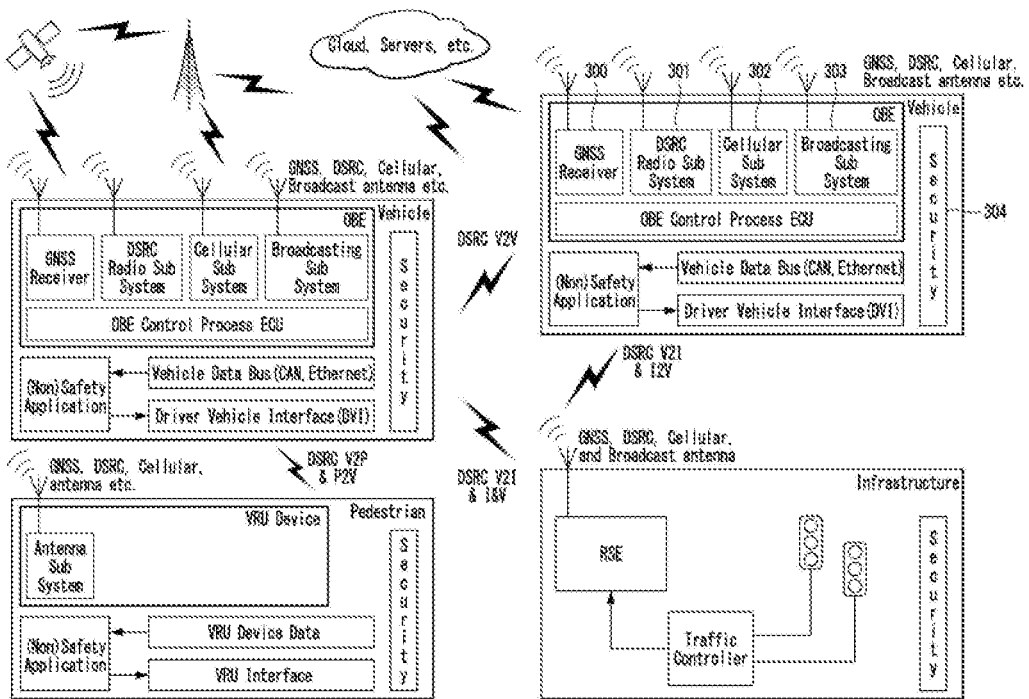

[Fig. 4]
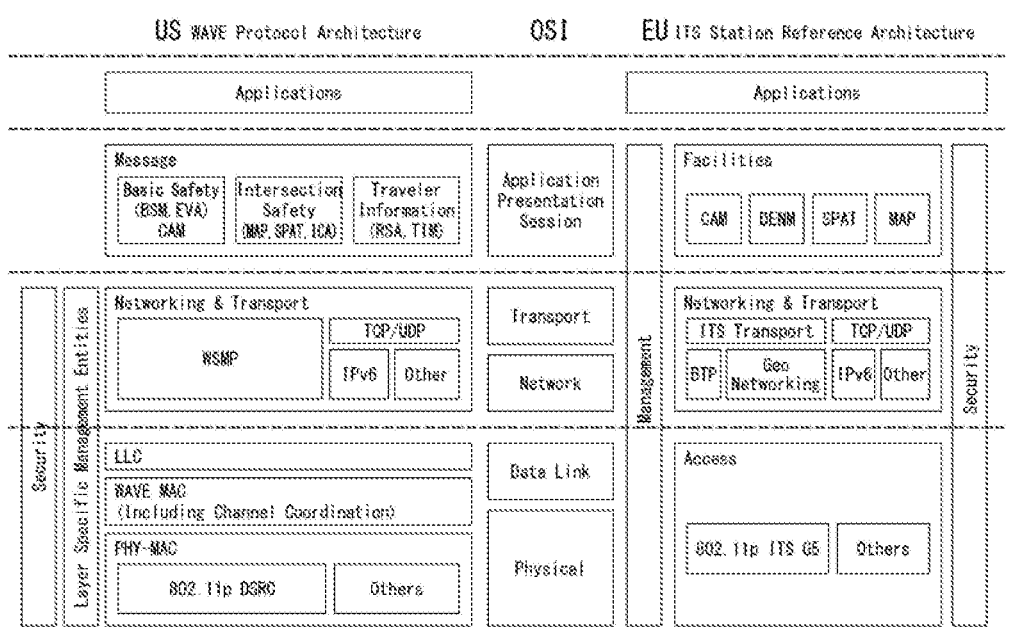

[Fig. 5]
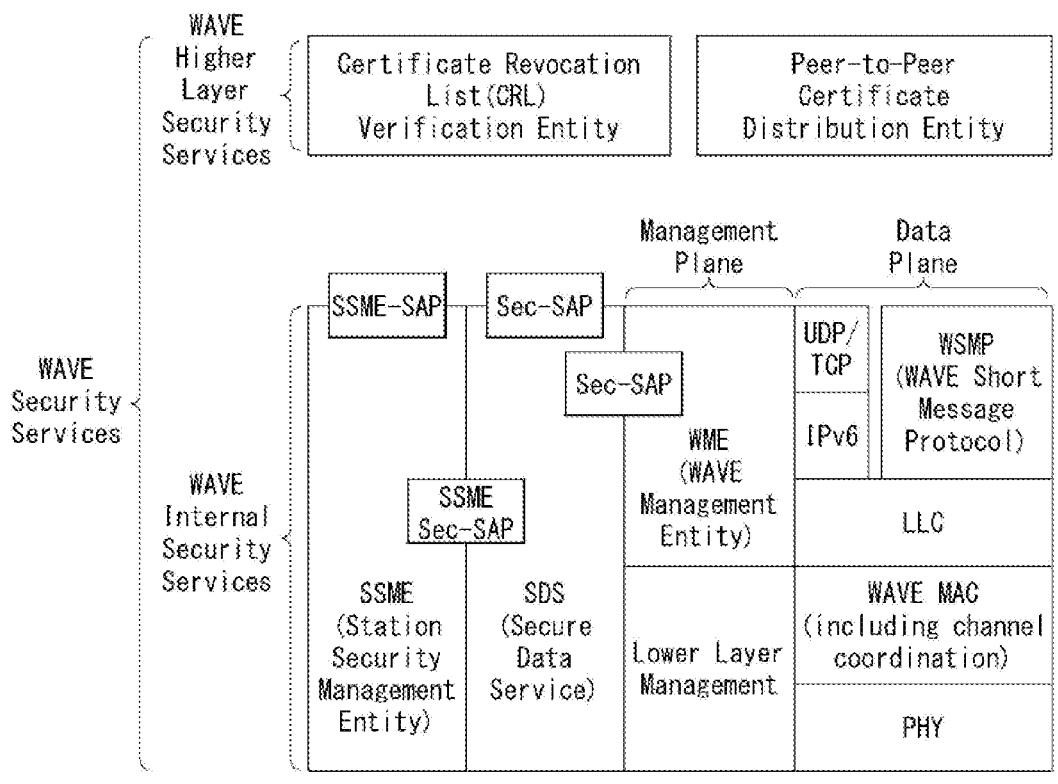

[Fig. 6]
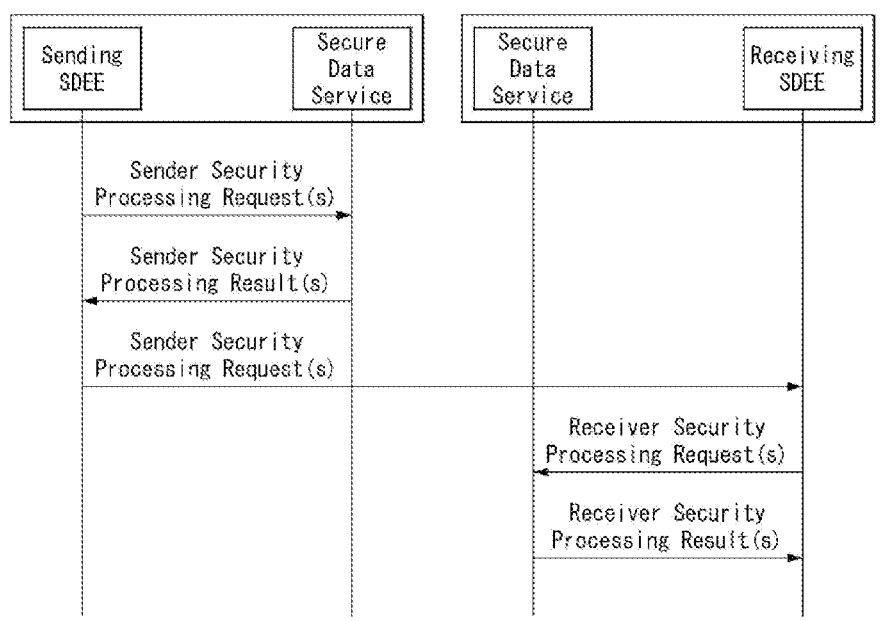

[Fig. 7]
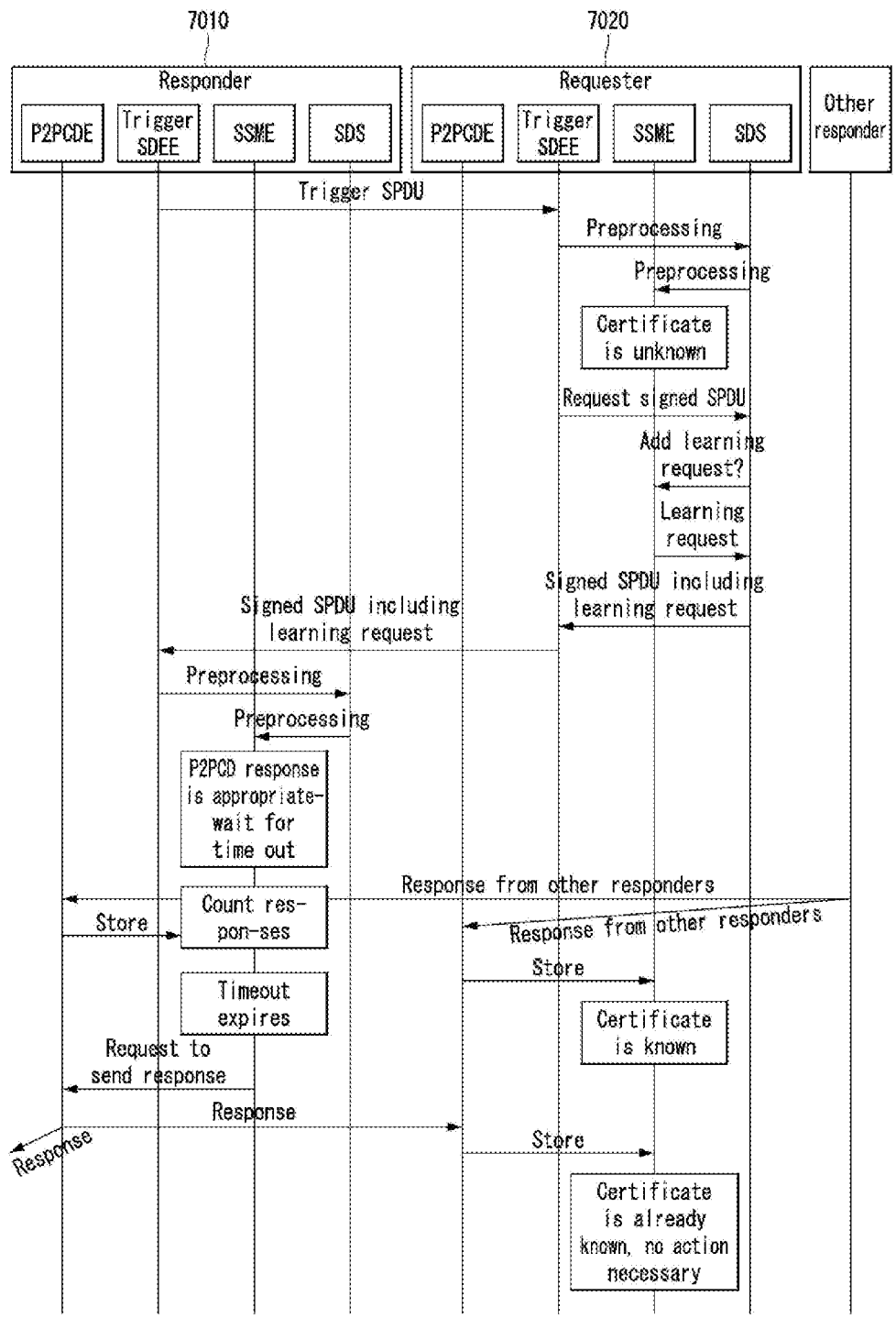

[Fig. 8]
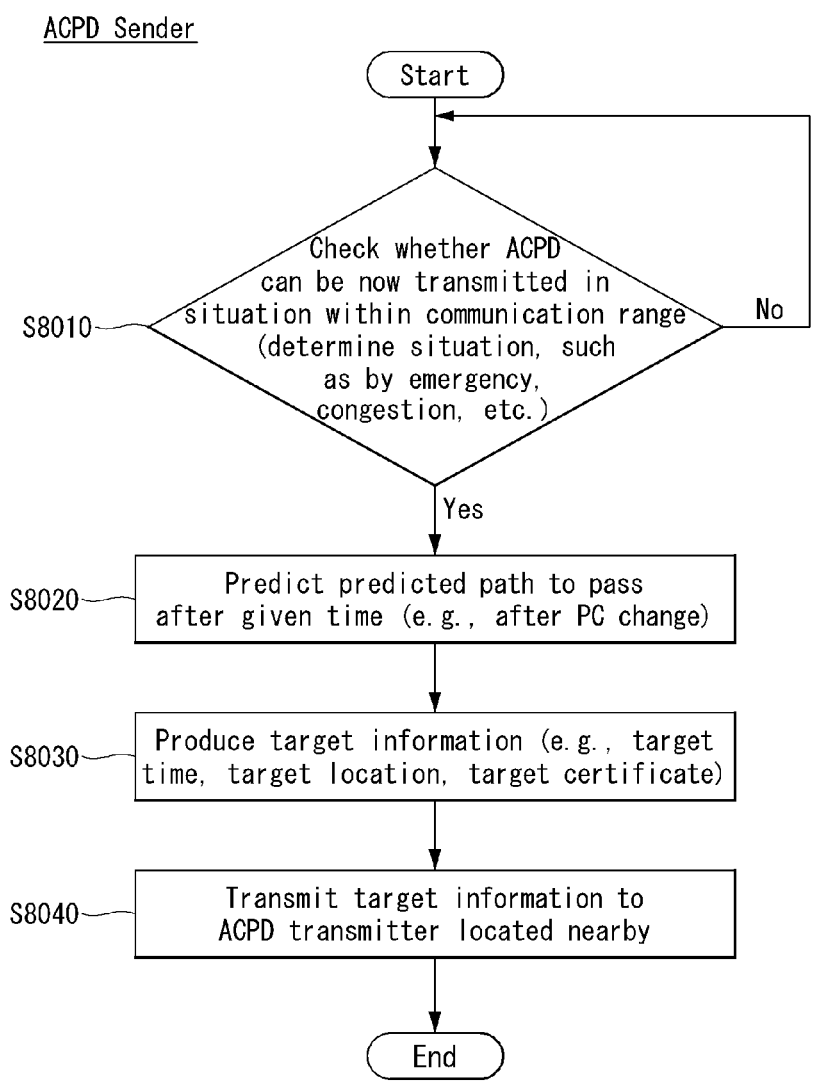

[Fig. 9]
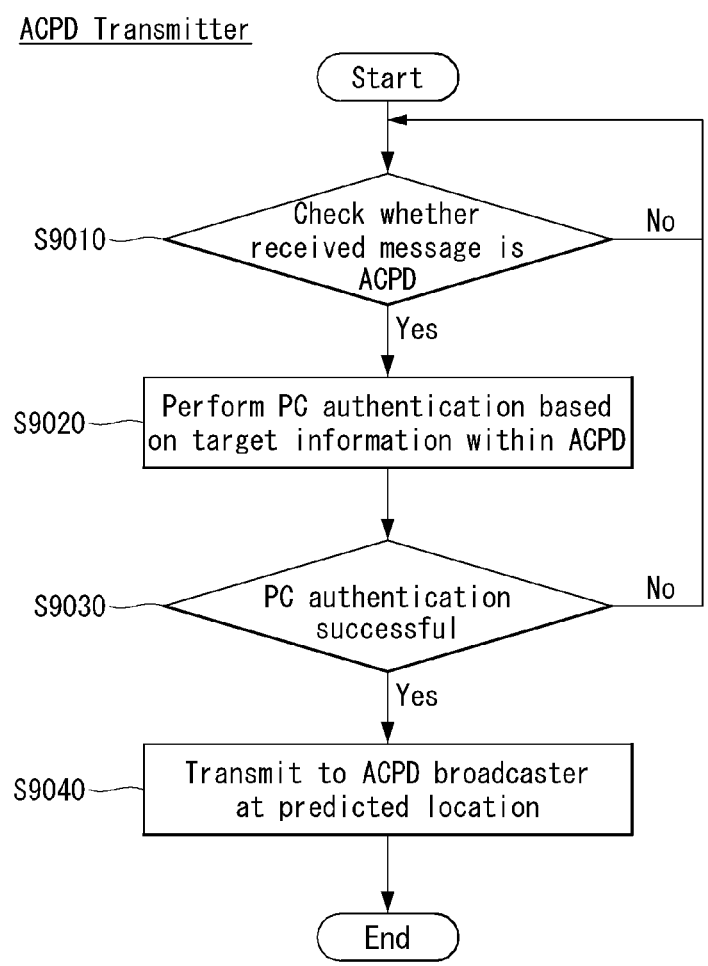

[Fig. 10]
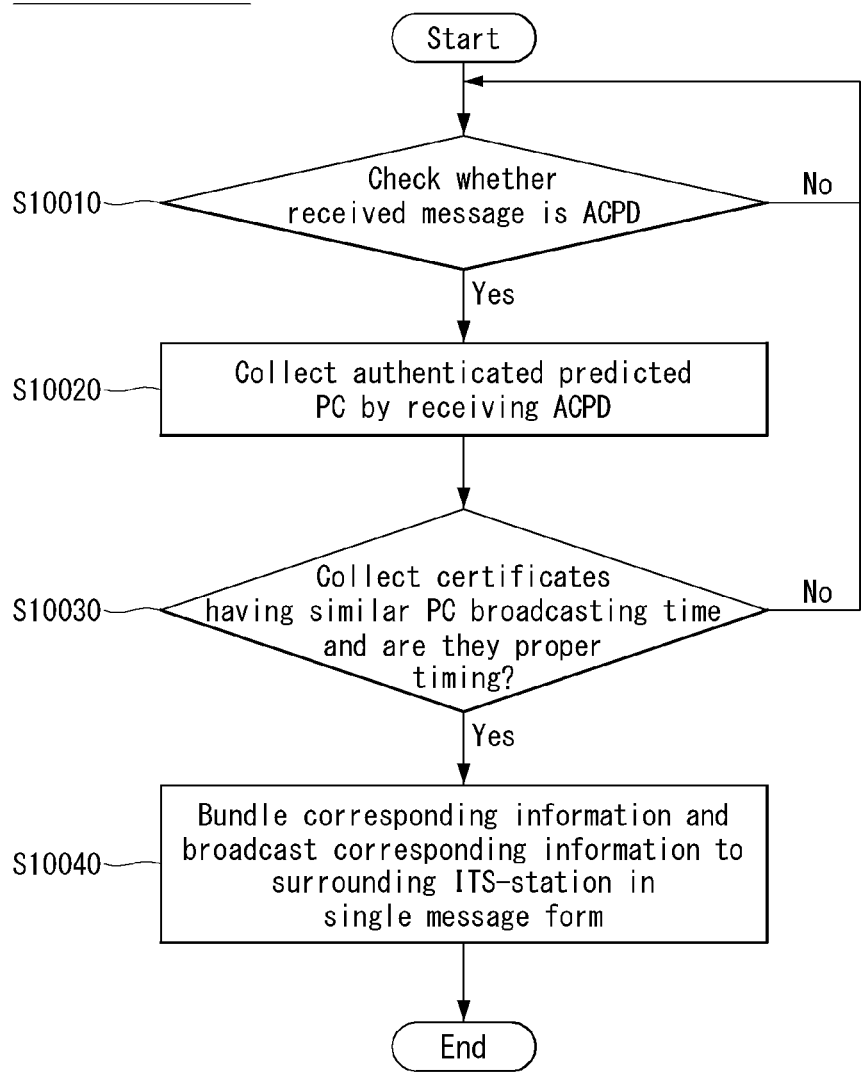

[Fig. 11]
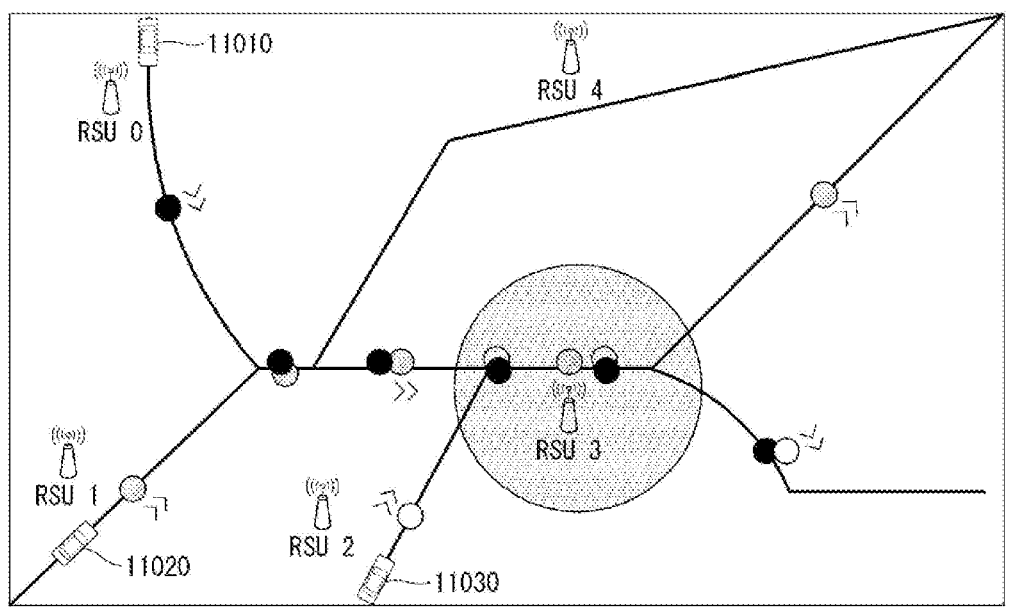

[Fig. 12]
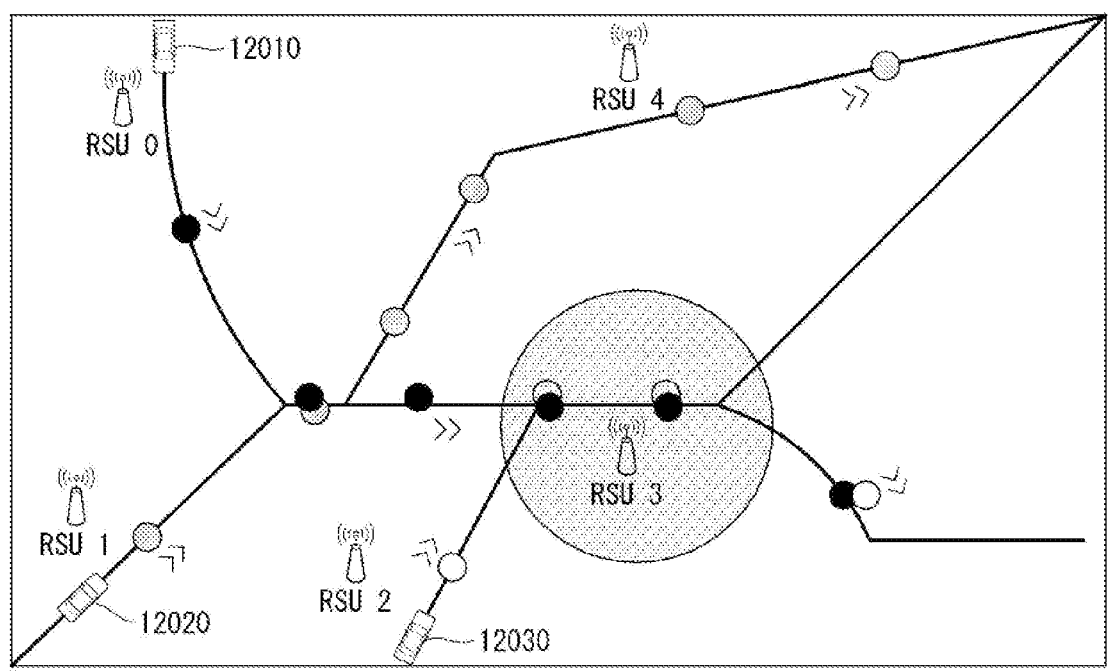

[Fig. 13]
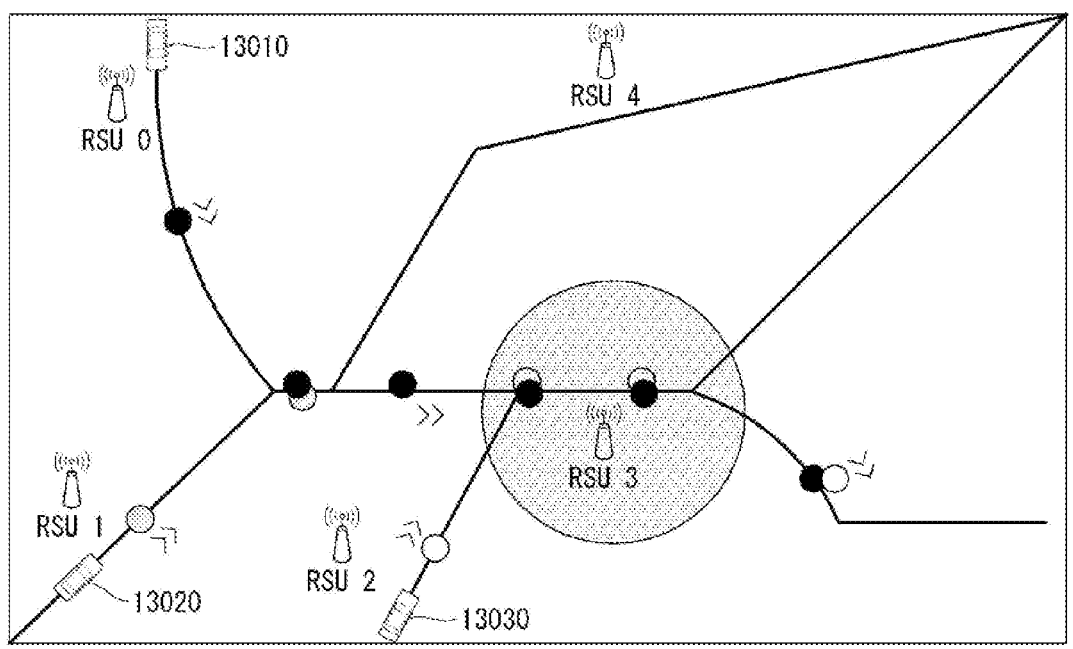

[Fig. 14]
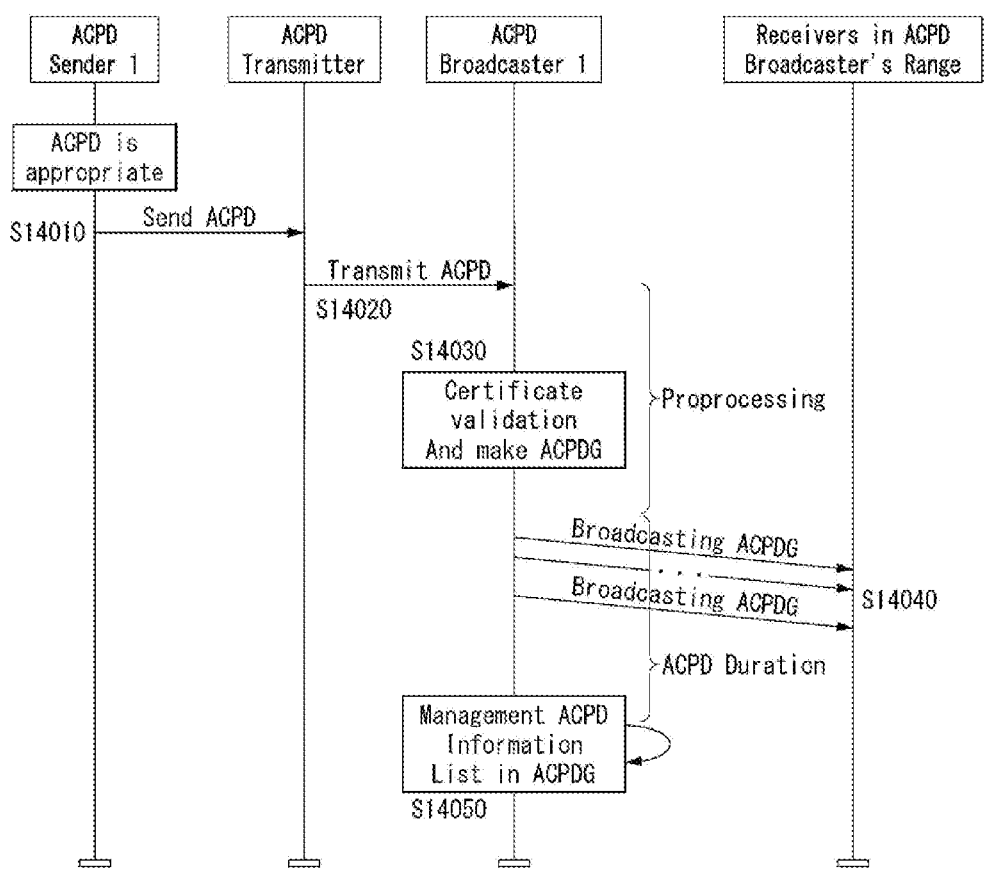

[Fig. 15]
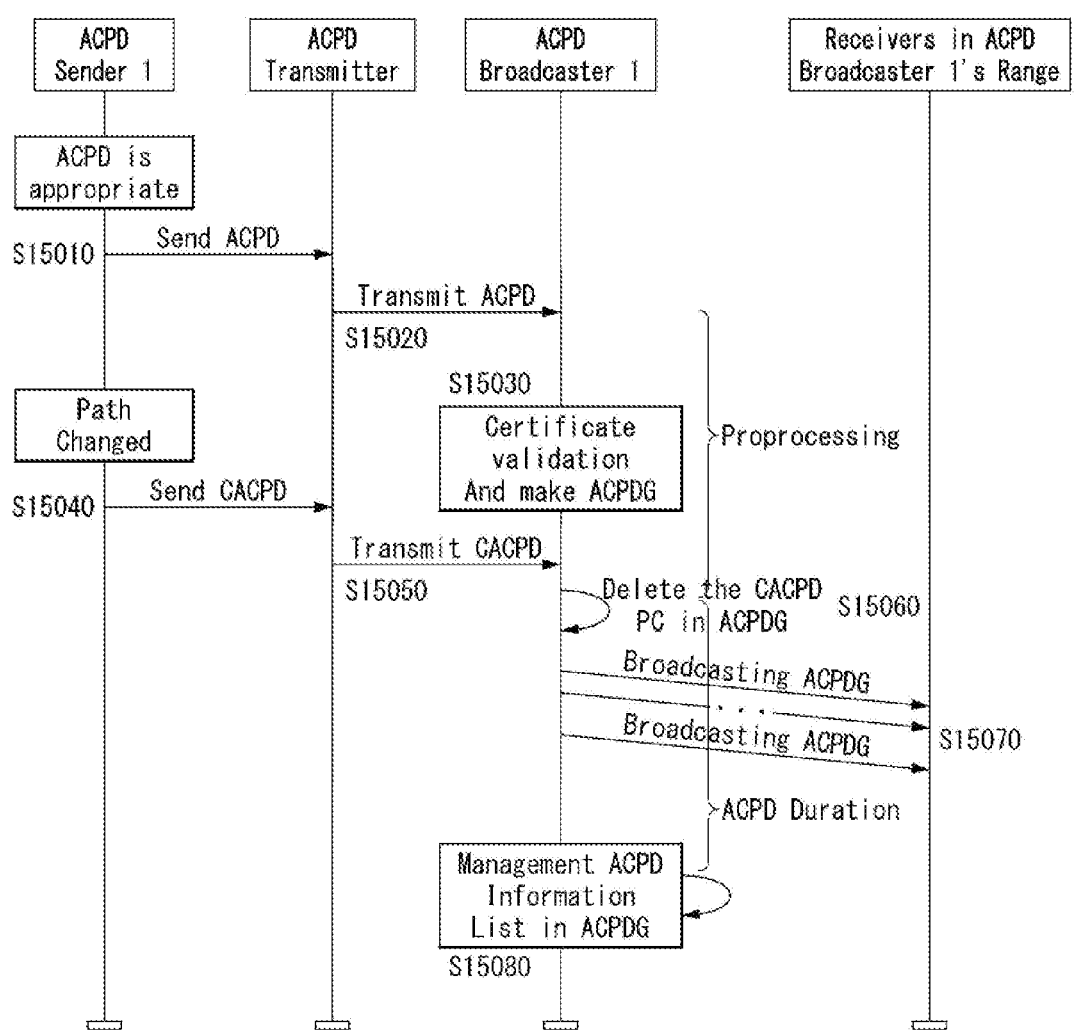

[Fig. 16]
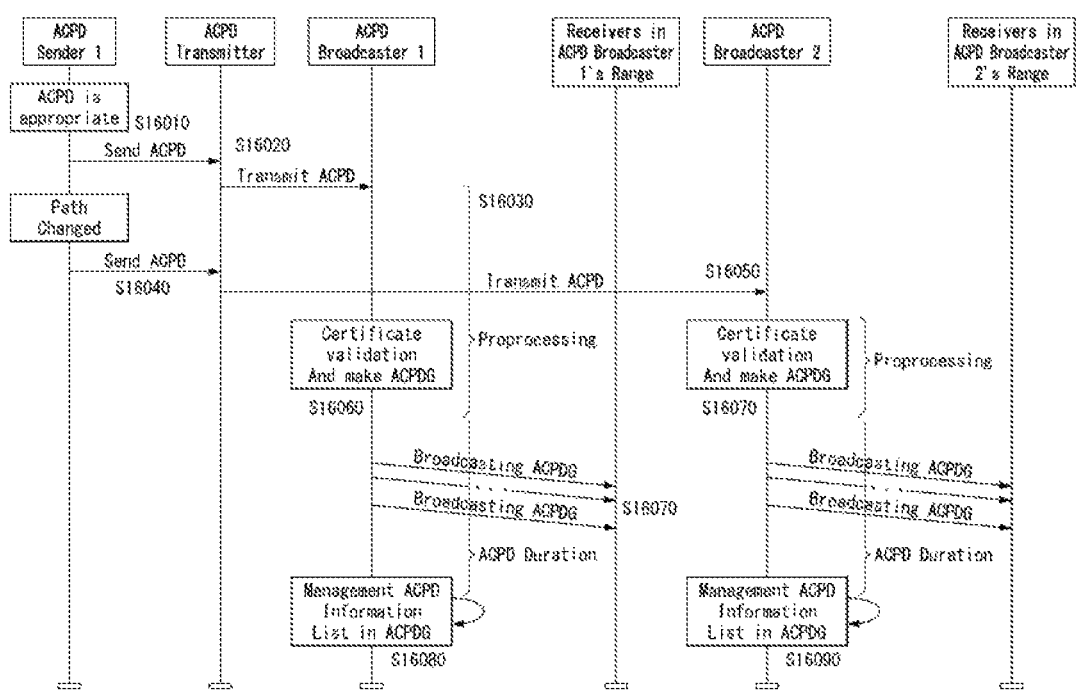

[Fig. 17]
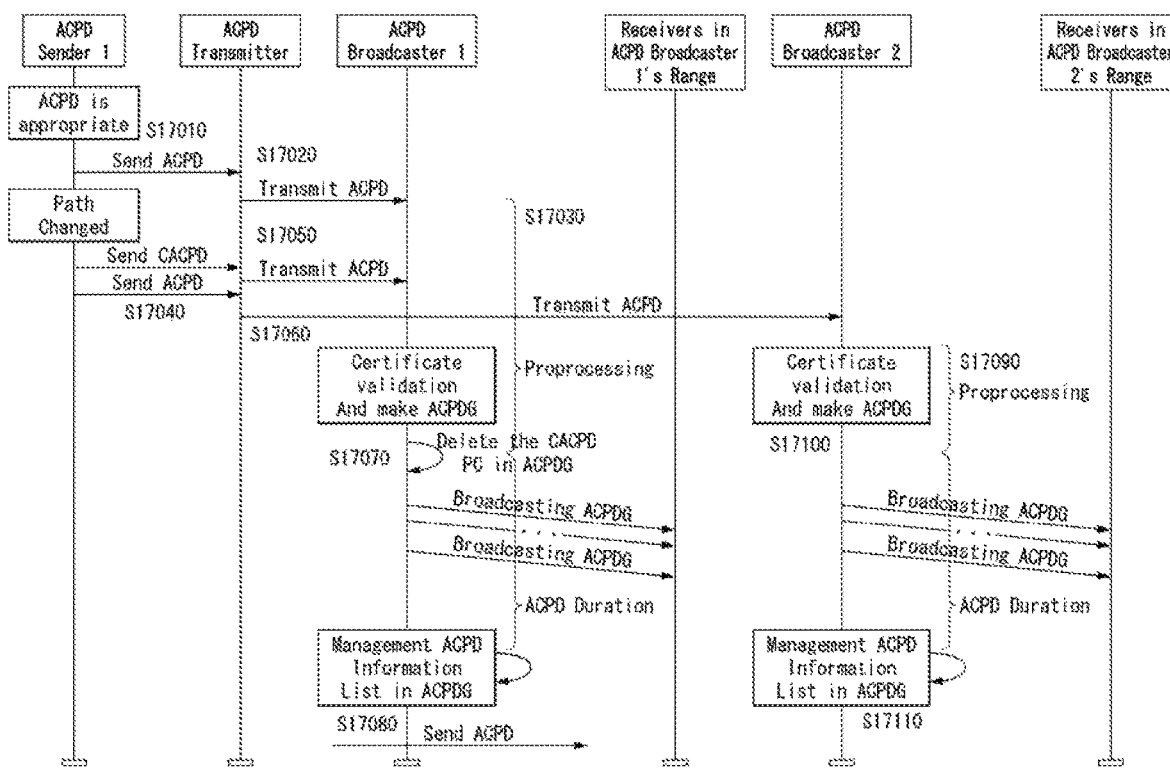

【Fig. 18】

(a)
| Header Fields | Payload | Trailer Fields |
|---|---|---|
| Full Certificate (AT) | | Signature |

(b)
| Header Fields | Payload | Trailer Fields |
|---|---|---|
| Certificate Digest | | Signature |

[Fig. 19]
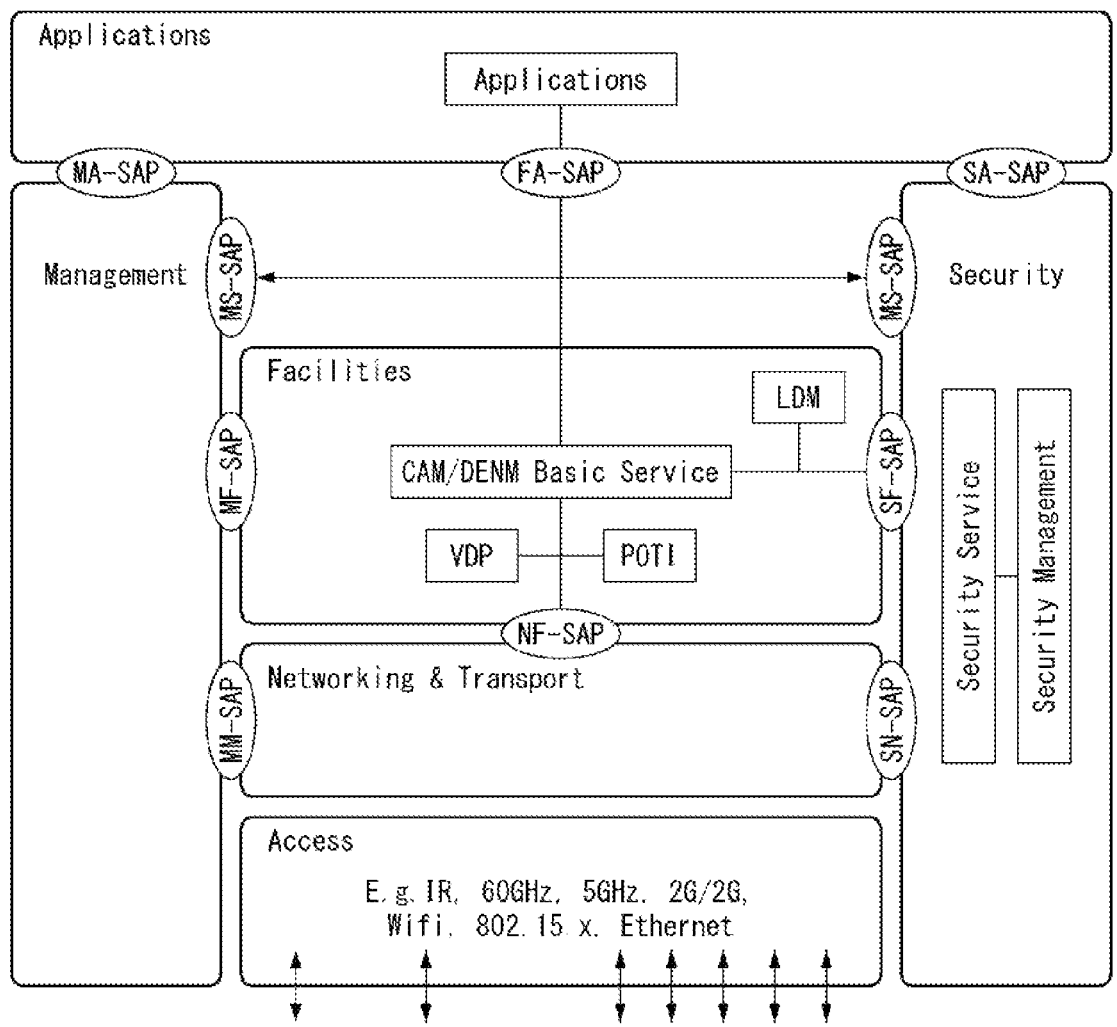

[Fig. 20]
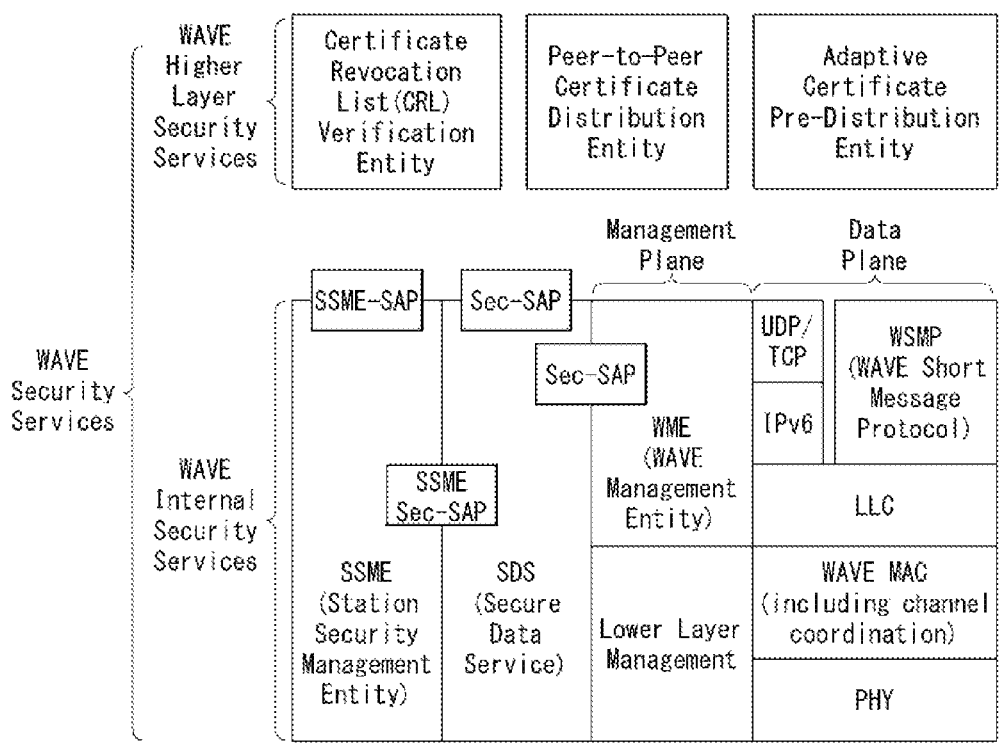

[Fig. 21]
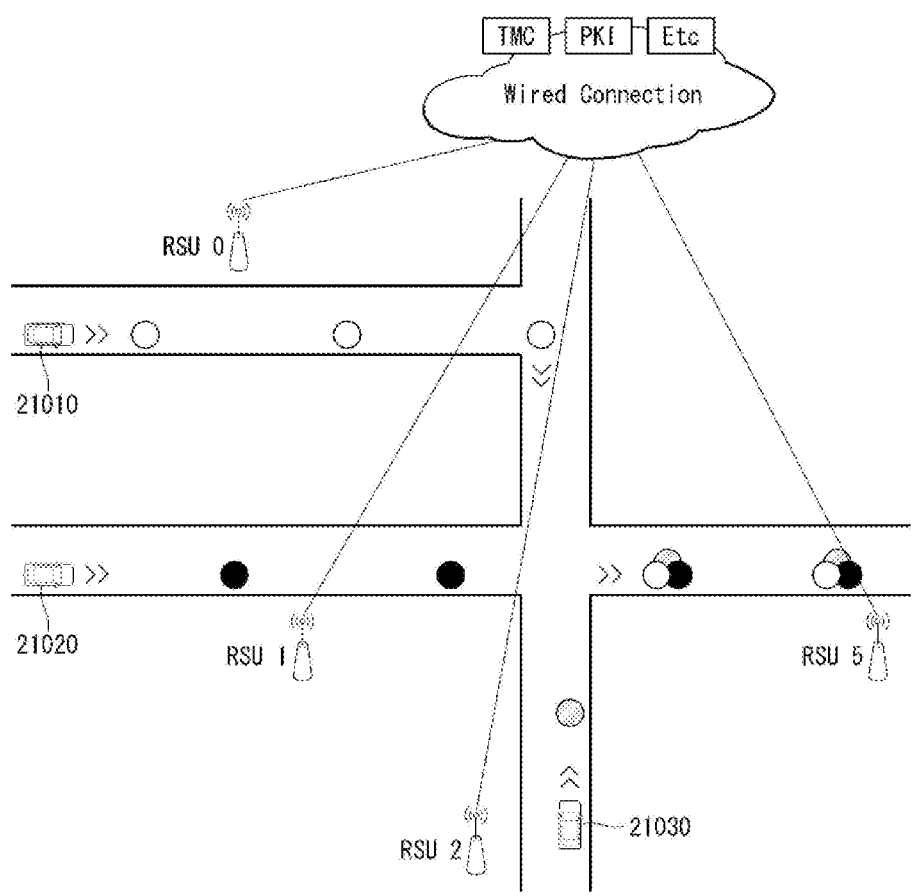

[Fig. 22]
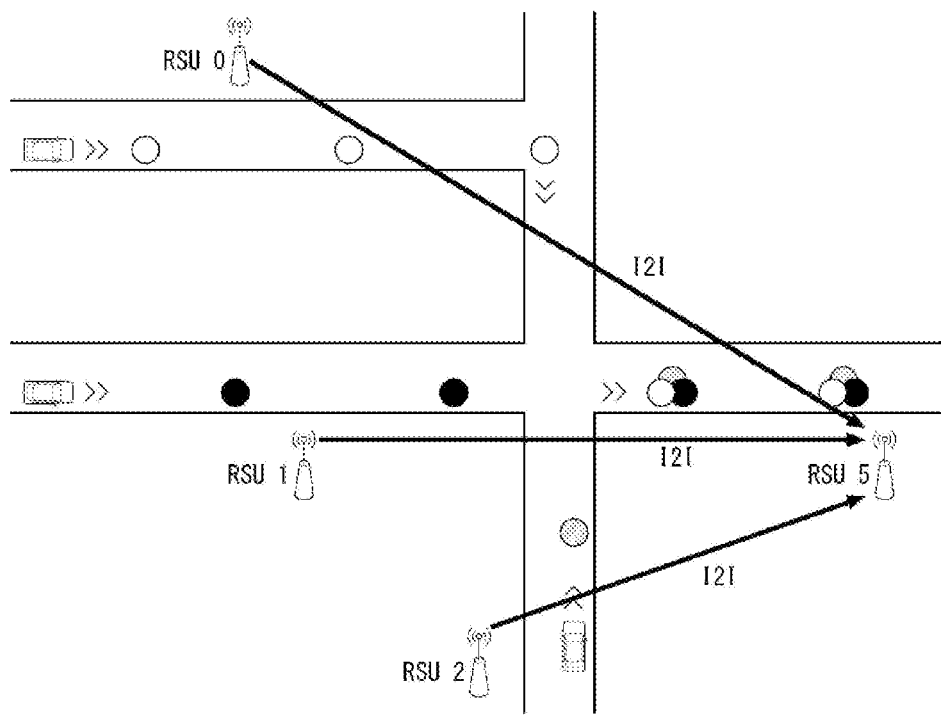

[Fig. 23]
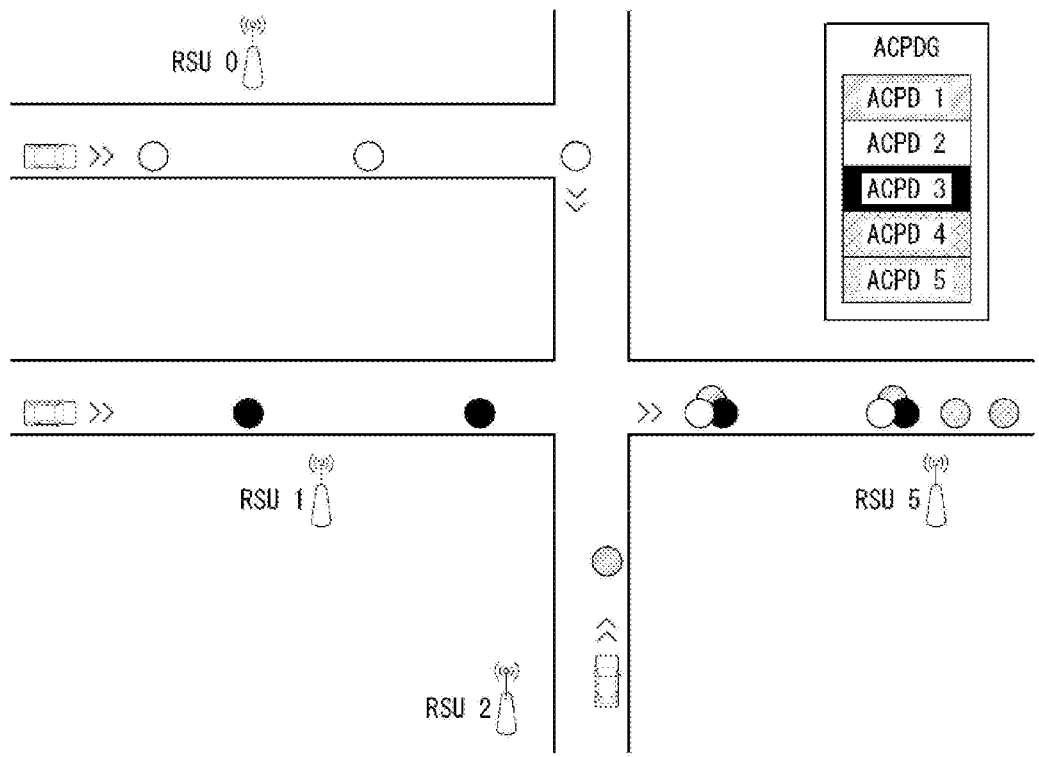

[Fig. 24]
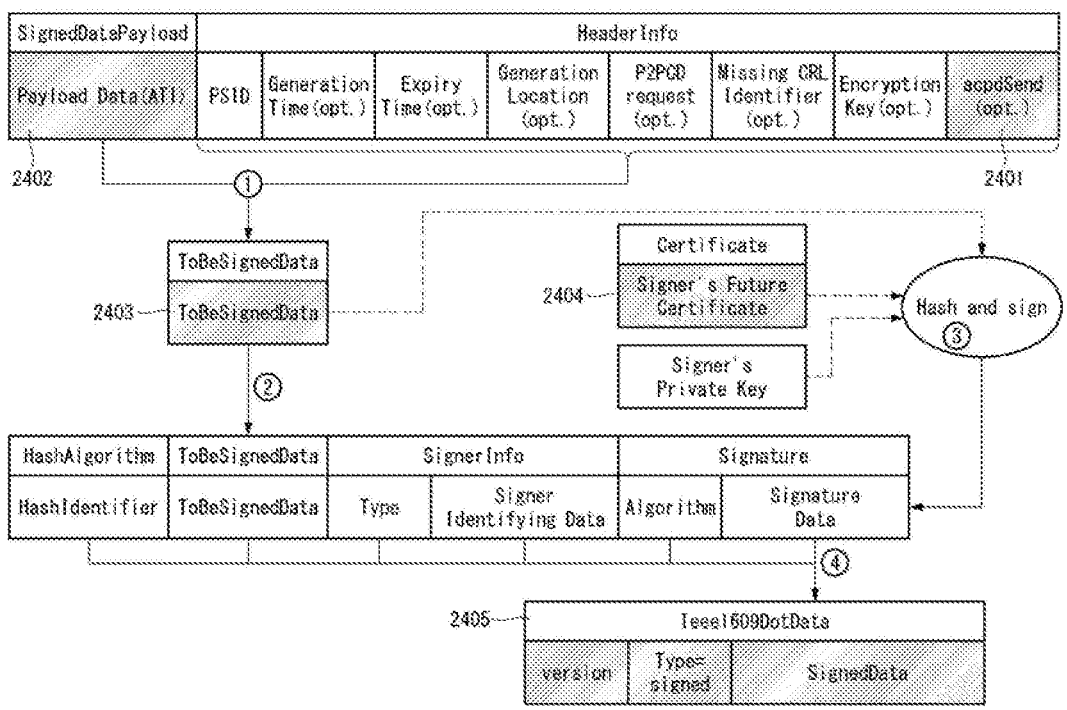

[Fig. 25]
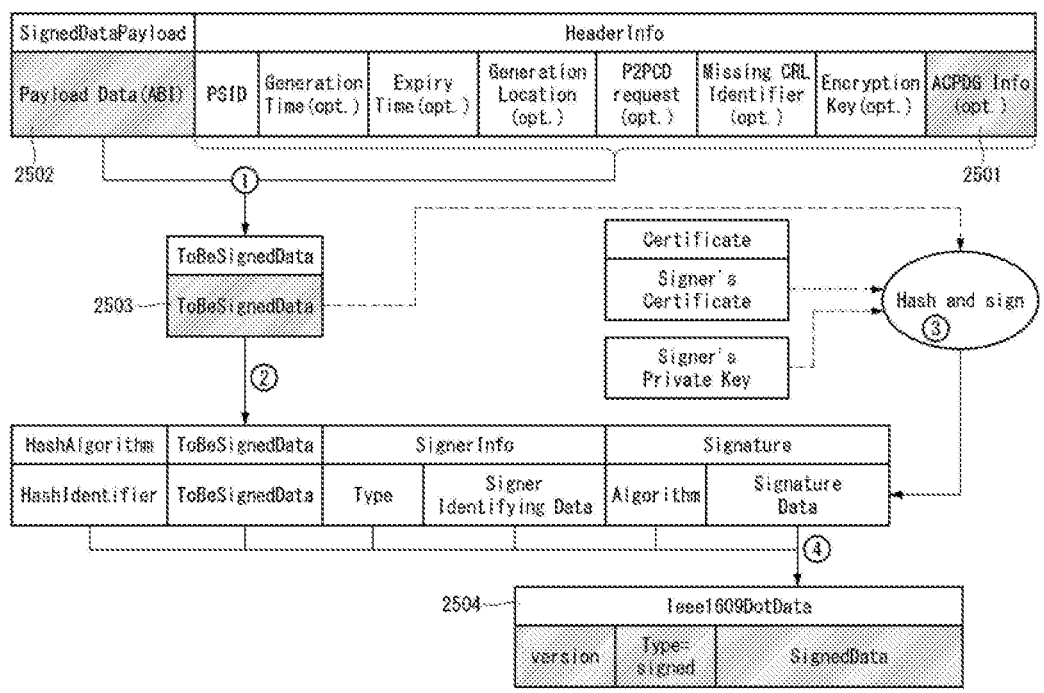

【Fig. 26】
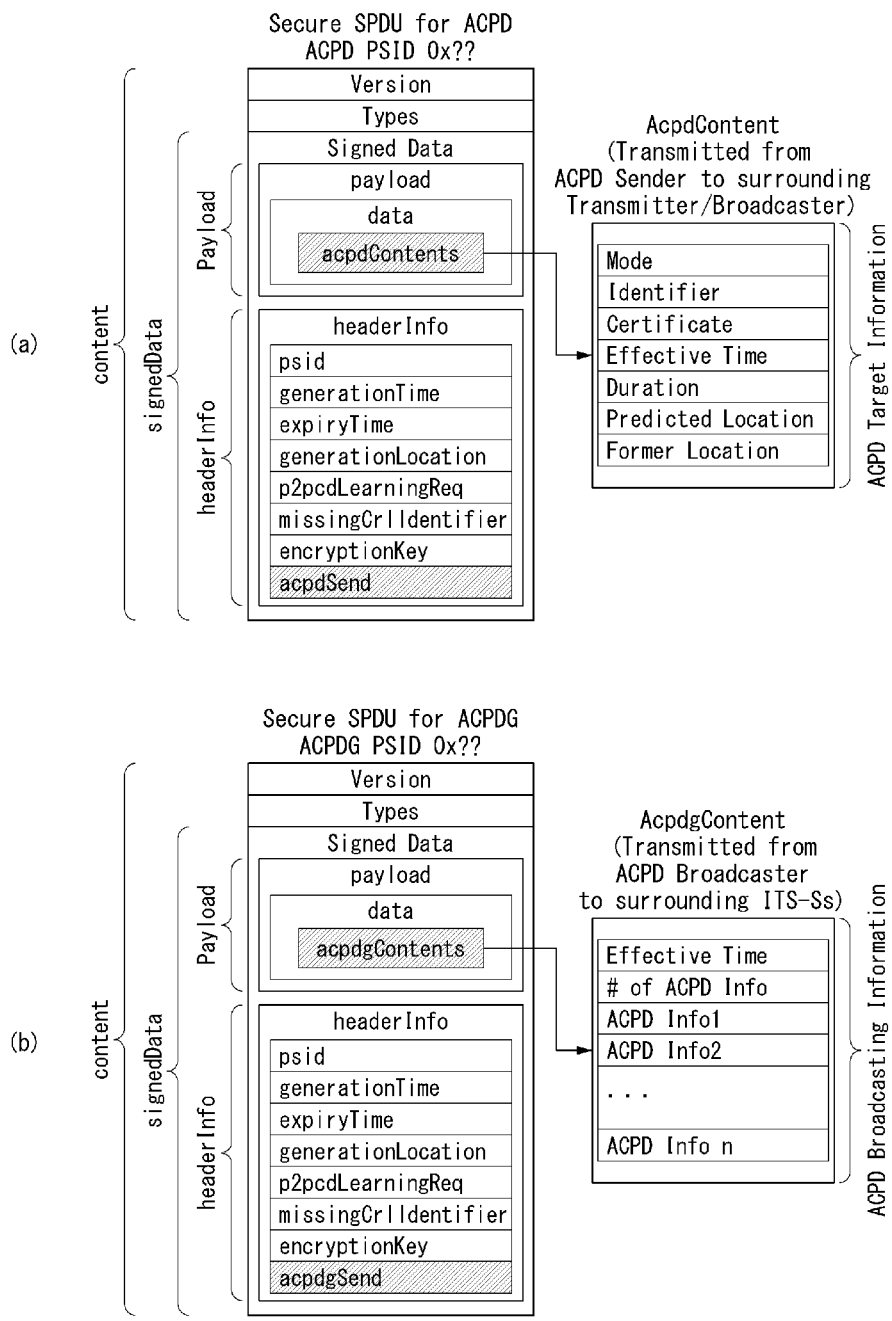

[Fig. 27]
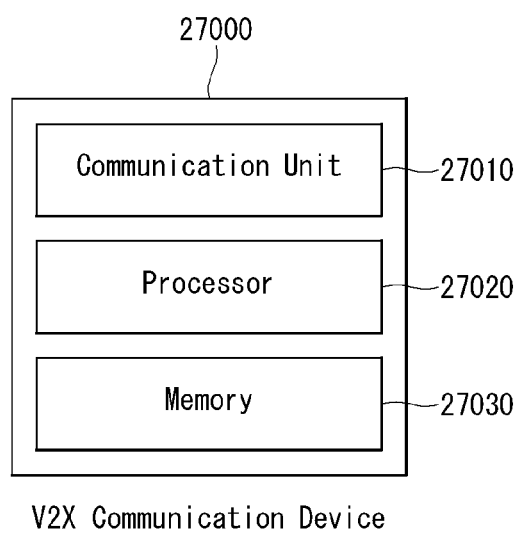
V2X Communication Device

[Fig. 28]
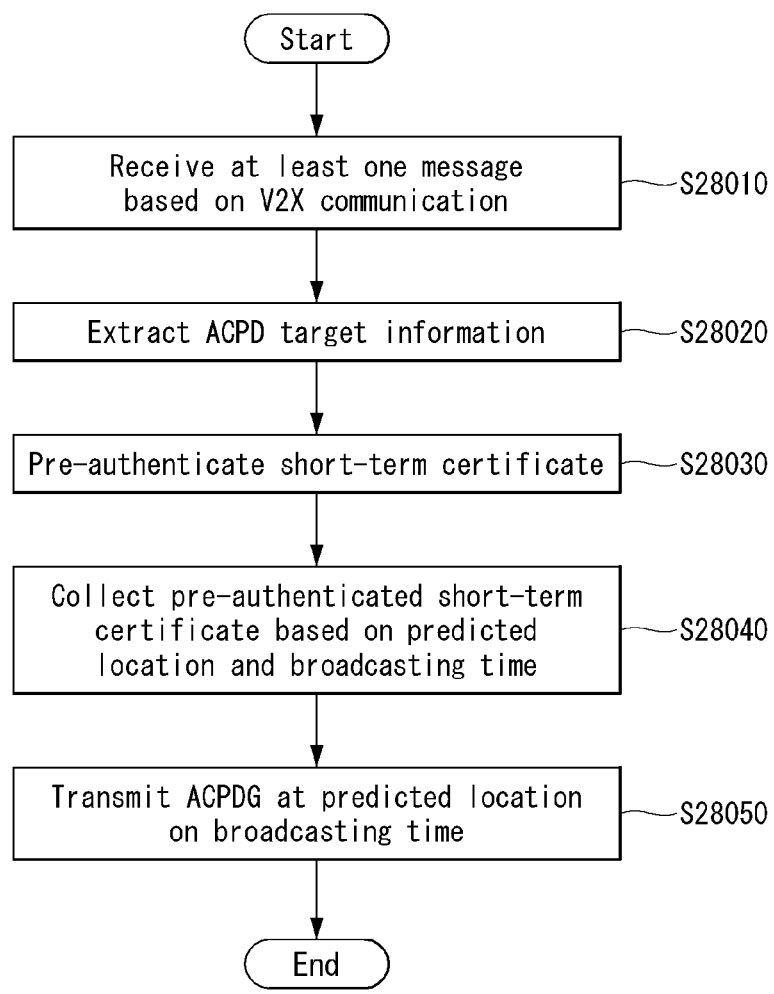

METHOD FOR SECURED COMMUNICATION AND APPARATUS THEREFOR

CROSS-REFERENCE TO RELATED APPLICATIONS

This application is the National Stage filing under 35 U.S.C. 371 of International Application No. PCT/KR2017/015208, filed on Dec. 21, 2017, contents of which are all hereby incorporated by reference herein in their entirety.

TECHNICAL FIELD

The disclosure relates to a device and secured communication method for V2X communication and, more particularly, to a communication method using a certificate for security and a secured communication method using a pre-authenticated certificate in addition to real-time authentication.

BACKGROUND ART

In recent years, a vehicle has become the result of the industrial convergence technology in which an electric technology, an electronic technology, and a communication technology are mixed, rather than the result of mechanical engineering technology. For this reason, the vehicle is also called a smart car. The smart car will provide not only a traditional vehicular technology, such as traffic safety and solving a traffic congestion, but also various user-customized transport services in the future by connecting a driver, a vehicle, a transport infrastructure, etc., one another. Such connectivity may be implemented using a vehicle-to-everything (V2X) communication technology. A system that provides the connectivity of a vehicle may also be referred to as a connected vehicle system.

DISCLOSURE

Technical Problem

As the connectivity of a vehicle is enhanced and increased, the amount and type of services, that is, a target of V2X communication, are also increasing. Furthermore, V2X communication requires low latency in order to improve the reliability and accuracy of a message. In contrast, an efficient V2X communication method is necessary because a channel is limited.

Technical Solution

In order to solve the aforementioned technical problem, a secured communication method of a V2X communication device includes receiving at least one message based on V2X communication, extracting adaptive certificate pre-distribution (ACPD) target information based on the at least one message including the ACPD target information, wherein the ACPD target information includes at least one of a short-term certificate, time information indicating a generation time of the ACPD target information, effective time information of the short-term certificate, information on a predicted location where the short-term certificate is to be used, or information on a predicted time when the short-term certificate is to be used, pre-authenticating at least one short-term certificate obtained from the ACPD target information, collecting at least one pre-authenticated short-term certificate to be broadcasted at a specific predicted location on a specific predicted time, and broadcasting an ACPD group (APCDG) message including the collected at least one pre-authenticated short-term certificate at the specific predicted location on the specific predicted time.

In the secured communication method of a V2X communication device according to an embodiment of the present disclosure, the ACPD target information further includes additional information for a short-term certificate addition.

The secured communication method of a V2X communication device according to an embodiment of the present disclosure further includes adding the short-term certificate of the ACPD target information to the ACPDG based on the effective time information and predicted location information of the ACPD target information based on the ACPD target information including the additional information.

In the secured communication method of a V2X communication device according to an embodiment of the present disclosure, the ACPD target information further includes cancellation information for a short-term certificate cancellation.

The secured communication method of a V2X communication device according to an embodiment of the present disclosure further includes deleting the short-term certificate of the ACPD target information from the ACPDG based on the effective time information and predicted location information of the ACPD target information based on the ACPD target information including the cancellation information.

In the secured communication method of a V2X communication device according to an embodiment of the present disclosure, the ACPDG broadcast message includes at least one of the at least one pre-authenticated short-term certificate, duration information indicating message broadcast duration, or effective time information.

In the secured communication method of a V2X communication device according to an embodiment of the present disclosure, the short-term certificate corresponds to a pseudonym certificate (PC) or an authorization ticket (AT).

In the secured communication method of a V2X communication device according to an embodiment of the present disclosure, the ACPD target information further includes mode information indicating an operation mode based on a path change or predicted arrival time change of an APCD sender.

In order to solve the aforementioned technical problem, a V2X communication device according to an embodiment of the present disclosure includes a memory storing data, at least one communication unit transmitting or receiving at least one of a wired signal or a wireless signal, and a processor controlling the memory and the communication unit. The processor is configured to receive at least one message based on V2X communication, extract adaptive certificate pre-distribution (ACPD) target information based on the at least one message including the ACPD target information, wherein the ACPD target information includes at least one of a short-term certificate, time information indicating a generation time of the ACPD target information, effective time information of the short-term certificate, information on a predicted location where the short-term certificate is to be used, or information on a predicted time when the short-term certificate is to be used, pre-authenticate at least one short-term certificate obtained from the ACPD target information, collect at least one pre-authenticated short-term certificate to be broadcasted at a specific predicted location on a specific predicted time, and broadcast an ACPD group (APCDG) message including the collected at least one pre-authenticated short-term certificate at the specific predicted location on the specific predicted time.

Advantageous Effects

The present disclosure proposes an adaptive certificate pre-distribution (ACPD) scheme for efficient message authentication while maintaining realtime in a V2X communication system. The V2X communication system may be denoted as a connected automated vehicle (CAV) system. The present disclosure can reduce a load applied for authentication when safe-related messages are practically transmitted or received in an emergency in real time or messages are exchanged in a congestion environment by proposing a scheme capable of previously distributing a PC/AT adaptively based on the aforementioned various V2X communication situations.

Hereinafter, effects of the present disclosure are described along with embodiments.

DESCRIPTION OF DRAWINGS

FIG. 1 illustrates a cooperative intelligent transport system according to an embodiment of the disclosure.

FIG. 2 illustrates a trust message communication method of a vehicle-to-everything (V2X) communication system according to an embodiment of the disclosure.

FIG. 3 illustrates communication between V2X communication devices according to an embodiment of the disclosure.

FIG. 4 illustrates a protocol stack of a V2X communication device according to an embodiment of the disclosure.

FIG. 5 illustrates a protocol stack of a V2X communication device providing a security service according to a first embodiment of the disclosure.

FIG. 6 illustrates a method in which a V2X communication device performs security processing according to an embodiment of the disclosure.

FIG. 7 illustrates a peer-to-peer certificate distribution method according to an embodiment of the disclosure.

FIG. 8 illustrates an ACPD execution method of an ACPD sender according to an embodiment of the disclosure.

FIG. 9 illustrates an ACPD execution method of an ACPD transmitter according to an embodiment of the disclosure.

FIG. 10 illustrates an ACPD execution method of an ACPD broadcaster according to an embodiment of the disclosure.

FIG. 11 illustrates a process of performing an ACPD according to an embodiment of the present disclosure.

FIG. 12 illustrates a process of performing an ACPD according to another embodiment of the present disclosure.

FIG. 13 illustrates a process of performing an ACPD according to another embodiment of the present disclosure.

FIG. 14 illustrates an operation of an ACPD sender in a basic ACPD mode according to an embodiment of the present disclosure.

FIG. 15 illustrates an operation of an ACPD sender in a change notification mode according to an embodiment of the present disclosure.

FIG. 16 illustrates an operation of an ACPD sender in a change forward mode according to an embodiment of the present disclosure.

FIG. 17 illustrates an operation of an ACPD sender in a change notification and forward mode according to an embodiment of the present disclosure.

FIG. 18 illustrates a comparison between the sizes of certificates according to an embodiment of the present disclosure.

FIG. 19 illustrates ITS reference architecture for providing ACPD service according to an embodiment of the present disclosure.

FIG. 20 illustrates a WAVE protocol stack to which an ACPD entity for providing ACPD service has been added according to an embodiment of the present disclosure.

FIG. 21 illustrates a use example of an ITS-S in which an ACPD/ACPDG is supported according to an embodiment of the present disclosure.

FIG. 22 illustrates another use example of an ITS-S in which an ACPD/ACPDG is supported according to an embodiment of the present disclosure.

FIG. 23 illustrates another use example of an ITS-S in which an ACPD/ACPDG is supported according to an embodiment of the present disclosure.

FIG. 24 illustrates a method of transmitting ACPD information according to an embodiment of the present disclosure.

FIG. 25 illustrates a method of transmitting ACPD information according to another embodiment of the present disclosure.

FIG. 26 illustrates ACPD content transmitted by an ACPD sender and an ACPD message transmitted by an ACPD broadcaster according to an embodiment of the present disclosure.

FIG. 27 illustrates a V2X communication device according to an embodiment of the present disclosure.

FIG. 28 is a flowchart illustrating a secured communication method according to an embodiment of the present disclosure.

BEST MODE

Exemplary embodiments of the disclosure will be described in detail, and examples thereof are illustrated in the accompanying drawings. The detailed description, which will be given below with reference to the accompanying drawings, is intended to explain exemplary embodiments of the disclosure, rather than to show only embodiments that may be implemented according to the disclosure. The following detailed description includes specific details in order to provide a thorough understanding of the disclosure. However, it will be apparent to those skilled in the art that the disclosure may be practiced without such specific details. In the disclosure, respective embodiments described below need not be used separately. Multiple embodiments or all embodiments may be used together and a combination of specific embodiments may be also be used.

Although most terms used in the disclosure have been selected from general ones widely used in the art, some terms have been arbitrarily selected by the applicant and their meanings are explained in detail in the following description as needed. Therefore, the disclosure should be understood based upon the intended meanings of the terms rather than their simple names or meanings.

The disclosure relates to a vehicle-to-everything (V2X) communication device, in which the V2X communication device may be included in an intelligent transport system (ITS) to perform all or part of functions of the ITS. The V2X communication device may perform vehicle-to-vehicle communication, vehicle-to-infrastructure communication, vehicle-to-bicycle communication, vehicle-to-mobile communication, and the like. According to an embodiment, the V2X communication device may be an on board unit (OBU)

of a vehicle, or may be included in an OBU. The OBU may also be referred to as an on board equipment (OBE). The V2X communication device may be a roadside unit (RSU) of an infrastructure, or may be included in an RSU. The RSU may also be referred to as roadside equipment (RSE). Alternatively, the V2X communication device may be an ITS station, or may be included in the ITS station. Any OBU, RSU, mobile equipment, or the like that performs V2X communication may be collectively referred to as an ITS station. Alternatively, the V2X communication device may be a wireless access in vehicular environments (WAVE) device, or may be included in the WAVE device. The V2X communication device may also be abbreviated to V2X device.

FIG. 1 illustrates a cooperative intelligent transport system (C-ITS) according to an embodiment of the disclosure.

The C-ITS is a system in which an information communication, control, and electronic technology is added to the existing transport system to improve efficiency in transport management and improve user convenience and safety. In the C-ITS, in addition to a vehicle, a transport infrastructure system such as a traffic light and an electronic display also performs V2X communication, and such an infrastructure may also be abbreviated to RSU as described above.

As illustrated in FIG. 1, in the C-ITS, a pedestrian device 1010, an RSU 1020, and vehicles 1030, 1040, and 1050, each of which includes the V2X communication device, perform communication with one another. According to an embodiment, the V2X communication may be performed based on a communication technology of IEEE 802.11p. The communication technology based on IEEE 802.11p may also be referred to as dedicated short-range communication (DSRC). According to an embodiment, the V2X communication based on IEEE 802.11p may be short-range communication within a range of about 600 m. Through the V2X communication, a cooperative awareness message (CAM) or a decentralized environmental notification message (DENM) may be broadcasted.

The CAM is distributed in an ITS network, and provides information regarding at least one of a presence, a location, or a communication state of the ITS station. The DENM provides information regarding a detected event. The DENM may provide information regarding any traveling situation or an event detected by the ITS station. For example, the DENM may provide information regarding a situation such as an emergency electronic brake light, an automobile accident, a vehicle problem, and traffic conditions.

In FIG. 1, the vehicles 1030 and 1040 are present within a communication coverage of the RSU 1020. However, the vehicle 1050 is present outside the communication range of the RSU 1020, and thus may not directly perform communication with the RSU.

FIG. 2 illustrates a trust message communication method of a V2X communication system according to an embodiment of the disclosure.

According to an embodiment illustrated in FIG. 2, the V2X communication system may be a security system required for V2X communication devices (e.g., an ITS station or a WAVE device) to safely send and receive a message for V2X communication. Such a V2X communication system may include one or more entities for trusted communication for a message. For example, the V2X communication system may include a root certificate authority (CA), an enrollment authority (EA), an authorization authority (AA), and/or at least one V2X communication device, as illustrated in FIG. 2. According to an embodiment, the V2X communication device may be an OBE, or an RSE.

The root CA may provide the EA and the AA with a proof to issue enrollment credentials. Such a root CA may define authorities and duties of the EA and the AA, certify the EA and the AA, and check performance of the duties by the EA and the AA. As such, the EA and AA may be controlled by the root CA.

The EA is an entity serving to manage a life cycle of the enrollment credentials, and may certify the V2X communication device and grant an access to V2X communication. The EA may also be referred to as a long-term certificate authority. Such an EA may issue an enrollment certificate (EC). The V2X communication device may have the EC for certification of whether the sending V2X communication device is a certified V2X sending device. The EC may also be referred to as a long term certificate (LTC).

The AA is an entity serving to issue an authorization ticket (AT) and monitor use of the AT, and may provide the V2X communication device with an authoritative proof to allow the V2X communication device to use a specific V2X service. The AA may also be referred to as a short-term certificate authority or a pseudonym certificate authority. Such an AA may issue the AT. The V2X communication device may have the AT for authentication of a V2X message (e.g., CAM or DENM) received by the V2X communication device. The AT may also be referred to as a short-term certificate or a pseudonym certificate (PC).

The V2X communication device may acquire the right to access V2X communication from the EA, and may negotiate with the AA for the right to call a V2X service. For example, the V2X communication device may request the EA for the EC (LCT), and acquire the EC from the EA. Further, the V2X communication device may request the AA for the AT (PC), and acquire the EC from the EA. In addition, the V2X communication device may send and receive a V2X message. For example, the V2X communication device may perform communication for a trust message with another V2X communication device by using the EC and the AT. Further, the V2X communication device may forward a receive V2X message to another V2X communication device. In the present disclosure, a V2X communication device sending a V2X message is referred to as a sending V2X communication device, a V2X communication device receiving a V2X message is referred to as a receiving V2X communication device, and a V2X communication device forwarding a received V2X communication device to another V2X communication device is referred to as a relaying V2X communication device.

A method in which V2X communication devices in the V2X communication system (security system) including the entities described above perform trust message communication will be described below in detail with reference to the respective drawings.

FIG. 3 illustrates communication between V2X communication devices according to an embodiment of the disclosure.

In a connected vehicle system, V2X communication devices mounted in a vehicle, an infrastructure, and a personalized device of a pedestrian may include device components illustrated in FIG. 3, respectively.

A description of components included in a V2X communication device of a vehicle according to an embodiment illustrated in FIG. 3 will be provided below. A V2X communication device of a vehicle may further include an OBE. According to an embodiment, the OBE may include a plurality of antenna systems and an OBE control process electronic control unit (ECU). Antenna system components may be integrated with each other or may be individually provided. Alternatively, a combination of some of the antenna system components may be included.

Global navigation satellite system (GNSS): A satellite navigation system that uses a radio wave transmitted from a satellite to calculate a location, a height, and a speed of a moving object across the earth, which may correspond to an antenna and a subsystem thereof included in a V2X communication device of a vehicle and configured to obtain location information of the vehicle Dedicated short range communication (DSRC) radio subsystem: An antenna and a subsystem thereof for sending/reception according to a DSRC protocol Cellular subsystem: An antenna and a subsystem thereof for cellular data communication Broadcasting subsystem: An antenna and a subsystem thereof for sending/reception of broadcasting data OBE control process ECU: The OBE control process ECU may be abbreviated to a controller or a processor. The controller may process a data message received from a plurality of heterogeneous systems and control other ECUs in the vehicle to perform appropriate operation. The controller may execute an application for the data processing and vehicle control/operation. Further, the controller may process sensing data received from other electronic equipment or sensors in the vehicle and send the processed sensing data to external V2X communication devices/vehicles. According to an embodiment, all information in the vehicle may be converted into a standardized format that is sharable through the controller. As illustrated in FIG. 3, a safety application may be executed to send and receive information to and from a bus such as a controller area network (CAN) or Ethernet in the vehicle. Further, information may be provided to a user through a driver vehicle interface (DVI) such as a stereo and a display in the vehicle.

The V2X communication device configured as described above may perform communication with an infrastructure, a pedestrian, and a supported system such as a cloud/server, in addition to another vehicle.

A description of components included in a V2X communication device of an infrastructure according to an embodiment illustrated in FIG. 3 will be provided below. A V2X communication device of an infrastructure may include an RSE. Similarly to the OBE of the vehicle, the RSE may include a plurality of antenna systems and a controller (processor). Antenna system components may be integrated with each other or may be individually provided. Alternatively, a combination of some of the antenna system components may be included. Meanwhile, the controller of the RSE may perform operations that are the same as or similar to those of the controller of the OBE. For example, the controller of the RSE may process a data message received from a plurality of heterogeneous systems and control other ECUs in the infrastructure to perform appropriate operation.

The RSE may receive information from a traffic controller to perform communication with a vehicle. The RSE may be a fixed device, and may be backend-connected to be operated as a provider. However, according to an embodiment, the RSE may collect information from a vehicle and send the information again, and thus the RSE may be operated not only as a provider device, but also as a user device.

A description of components included in a V2X communication device of a personalized device (VRU device) of a pedestrian according to an embodiment illustrated in FIG. 3 will be provided below. The V2X communication device of the VRU device may include a plurality of antenna systems and a controller (processor). Antenna system components may be integrated with each other or may be individually provided. Alternatively, a combination of some of the antenna system components may be included. Meanwhile, the controller of the VRU device may perform operations that are the same as or similar to those of the controller of the OBE. For example, the controller of the VRU device may process a data message received from a plurality of heterogeneous systems and control other ECUs in the personalized device to perform appropriate operation. The controller may execute an application for the data processing and control/operation of the personalized device. Further, the controller may process sensing data received from other electronic equipment or sensors in the personalized device and send the processed sensing data to external V2X communication devices. As illustrated in FIG. 3, a safety application may be executed to send and receive information to and from components in the personalized device. Further, information may be provided to a user through a VRU interface such as a stereo and a display in the personalized device.

As illustrated in FIG. 3, communication between vehicles may be referred to as V2V communication, communication between a vehicle and an infrastructure may be referred to as V2I communication or I2V communication, and communication between a vehicle and a personalized device of a pedestrian may be referred to as V2P communication or P2V communication. As illustrated in FIG. 3, communication between vehicles using DSRC may be referred to as DSRC V2V communication, communication between a vehicle and an infrastructure using DSRC may be referred to as DSRC V2I communication or DSRC I2V communication, and communication between a vehicle and a personalized device of a pedestrian using DSRC may be referred to as DSRC V2P communication or DSRC P2V communication. Meanwhile, communication between a vehicle and another V2X communication device may be collectively referred to as V2X communication, and communication between a V2X communication device and another V2X communication device may be collectively referred to as X2X communication.

FIG. 4 illustrates a protocol stack of a V2X communication device according to an embodiment of the disclosure. Specifically, FIG. 4 illustrates a protocol stack of a V2X communication device of United States (US) or Europe (EU) according to an embodiment of the disclosure.

The V2X communication devices illustrated in FIG. 3 may perform communication with one another by using a communication protocol for V2X communication illustrated in FIG. 4.

Description of respective layers illustrated in FIG. 4 is provided below.

Applications layer: The applications layer may implement and support various use cases. For example, an application may provide information regarding road safety, efficient traffic information, information regarding other applications.

Facilities layer: The facilities layer is a layer corresponding to open systems interconnection (OSI) layer 5 (session layer), OSI layer 6 (presentation layer), and OSI layer 7 (application layer). The facilities layer may support effective implementation of various use cases defined in the applications layer. For example, the facilities layer may provide an application programming interface (API) for encoding/decoding a message for supporting an application. According to an embodiment, the message may be encoded/decoded in abstract syntax notation one (ASN.1).

A service and a message set provided in the facilities layer is defined by the Society of Automotive Engineers (SAE) in U.S., and is defined by Intelligent Transport Systems (ITS) of European Telecommunications Standards Institute in Europe. For example, a basic safety message (BSM) for supporting a basic safety application, an emergency vehicle alert (EVA) message, a MAP (mapdata) message for supporting an intersection safety application, a signal phase and timing (SPAT) message, an intersection collision alert (ICA) message, a roadside alert (RSA) message for supporting a traveler information application, a traveler information message (TIM), and the like may be provided as the message set in U.S. A cooperative awareness message (CAM), a decentralized environmental notification message (DENM), and the like may be provided as the message set in Europe.

Networking/transport layer: The networking/transport layer is a layer corresponding to OSI layer 3 (network layer) and OSI layer 4 (transport layer). The networking/transport layer may configure a network for vehicle communication between homogenous/heterogeneous networks by using various transport protocols and network protocols. For example, the networking/transport layer may provide Internet access and routing using the Internet protocol such as TCP/UDP+IPv6. Alternatively, the networking/transport layer may configure a vehicle network by using a geographical-position-based protocol such as basic transport protocol (BTP)/GeoNetworking. Alternatively, the networking/transport layer may configure a vehicle network by using a WAVE short message protocol (WSMP) (e.g., WSMP-N and WSMP-T).

Further, the networking/transport layer may provide an advertisement of provided services. For example, such an advertisement may be provided through WAVE service advertisement (WSA) in U.S., and may be provided through a service announcement message (SAM) in Europe.

Access layer: The access layer is a layer corresponding to OSI layer 1 (physical layer) and OSI layer 2 (data link layer). The access layer may send, on a physical channel, a message/data received from a higher layer. For example, the access layer may perform/support data communication based on at least one of a communication technology based on IEEE 802.11 and/or 802.11p standard, a WIFI physical transmission technology based on IEEE 802.11 and/or 802.11p standard, a DSRC technology, a 2G/3G/4G (LTE)/5G wireless cellular communication technology including satellite/broadband wireless mobile communication, a global positioning system (GPS) technology, Bluetooth, or a WAVE technology based on IEEE 1609. Meanwhile, in U.S., a medium access control (MAC) technology based on IEEE 1609.4 standard is complemented and used to support communication in a vehicle environment.

Security layer: The security layer is a layer for data trust and privacy. The security layer may provide an authentication function and an encryption function for assuring privacy. The authentication is used to indicate whether or not a sender is a certified V2X communication device and whether or not data are changed, and the encryption is used to keep secrets in data. According to an embodiment, the message or data generated in the networking/transport layer may be sent after being secured through the security layer according to a type of the message or data, or may be sent in a non-secured state.

Management layer: The management layer may provide multi-channel decentralized congestion control (MDCC). Further, the management layer may generate contents for a service advertisement based on information received from a higher layer, and the contents may include IP configuration information and security credential information. Further, the management layer may monitor the received service advertisement and estimate a channel quality to determine a channel allocation/switching schedule.

FIG. 5 illustrates a protocol stack of a V2X communication device providing a security service according to a first embodiment of the disclosure.

According to an embodiment illustrated in FIG. 5, the V2X communication device may be a V2X communication device (e.g., WAVE device) providing a security service based on IEEE 1609.2 standard. The security service in FIG. 5 may be referred to as a WAVE security service, and the protocol stack in FIG. 5 may be referred to as a WAVE protocol stack. The security service illustrated in FIG. 5 may include an internal security service and a higher external security service.

First, the internal security service may provide a secure data service (SDS) and a security services management entity (SSME).

The SDS may manage a protocol data unit (PDU). For example, the SDS may convert an unsecured PDU into a secured PDU (SPDU). Further, the SDS may perform processing of the SPDU at the time of reception, and in this processing, the SPDU is converted into a PDU. In this case, a format of the SPDU may be signed data or encrypted data. An entity using the secure data service may be referred to as a secure data exchange entity (SDEE).

The SSME may manage information regarding certificates. For example, the SSME may store/manage certificates stored in the SDS and certificate information regarding certificates belonging to certificate authorities (CA).

The higher layer security service may provide a certificate revocation list verification entity (CRLVE) and a peer-to-peer certificate distribution entity (P2PCDE).

The CRLVE may verify an incoming certificate revocation list (CRL). For example, the CRLVE may verify a CRL received from the SSME or to be forwarded to the SSME. Further, the CRLVE may forward relevant revocation information to the SSME for storage.

The P2PCDE enables peer-to-peer certificate distribution. The P2PCDE allows the WAVE device to learn unknown certificates. In this case, the WAVE device may request another peer device for necessary information and learn the unknown certificates by using the information.

In order to provide the above-described service, IEEE 1609.2 standard illustrated in FIG. 5 provides a service access point (SAP) (e.g., Sec-SAP, SSME SAP, and SSME-Sec SAP), and communication from one entity to another entity based on IEEE 1609.2 standard may be performed through the SAP. Such a communication may be referred to as data exchange between SDEEs.

FIG. 6 illustrates a method in which a V2X communication device performs security processing according to an embodiment of the disclosure.

As in FIG. 5, in an embodiment of FIG. 6, the V2X communication device may be a V2X communication device (e.g., WAVE device) providing a security service based on IEEE 1609.2 standard. The embodiment illustrated in FIG. 6 shows an illustrative flow of security processing using the security data service (SDS).

Referring to FIG. 6, the SDS may be called by the SDEE together with a request for processing data. The processed data may be returned to the SDEE that performs the call. The secure data exchange may include two SDEEs, one of which may be a sending SDEE, and the other of which may be a receiving SDEE.

The sending SDEE may call the SDS to perform security processing for sending. In this case, a result of the processing may be an SPDU returned to a sending entity. The sending SDEE may call the SDS at least once, if possible, may call the SDS multiple times before sending the SPDU.

The receiving SDEE may call the SDS to perform security processing for contents of the received SPDU. In this case, a result of the processing that may include the SPDU and additional information regarding the SPDU may be returned to the receiving SDEE. Complete processing of the received SPDU may require multiple calls.

FIG. 7 illustrates a peer-to-peer certificate distribution method according to an embodiment of the disclosure.

A responder 7010 is the sender of a trigger SPDU. When a signed SPDU including a learning request is received, the responder 7010 starts a P2PCD learning response process. The responder 7010 starts the P2PCD learning response process when a trigger SDEE receives a request indicating that an SDS has processed the signed SPDU including a P2PCD response request through "Sec-SecureDataProcessing.request." When the P2PCD learning response process is triggered, after an SSME randomly waits for a period equal to or smaller than p2pcd_maxResponseBackoff, it generates a response and transmits the response to a P2PCDE. The P2PCD learning response includes requested certificates. The P2PCDE receives a P2PCD learning response and provides it to the SSME. The SSME stores the certificates and increases a recorded number.

A requester 7020 is the receiver of a trigger SPDU. The role of the requester 7020 is started when a trigger SDEE makes a process request for an SPDU in which an SDS has been signed along with the signed identifier (SignedIdentifier) of a certificate type through Sec-SecureDataPreprocessing.request. With respect to the triggering request for an issuer, an SSME generates the SDS. The SDS is included in the signed SPDU including a P2PCD learning request for the issuer. The requester 7020 may transmit, to the responder 7010, the signed SPDU including the learning request. When a P2PCDE generates a P2PCD learning response, the requester 7020 enables the SSME to store a corresponding certificate using SSMEAddCerficate.request and makes the corresponding certificate become a known certificate.

Table 1 shows various parameters for PC management called a pseudonym change (PC) or an authorization ticket (AT) in the standard and project of the United States and Europe.

The existing ITS-related V2X network system has been configured to satisfy the following basic requirements for fast and reliable communication.

Operating in a rapidly varying environment

Fast and reliable communications, allowable latency (less than 100 ms)

Maintaining connections with speeding vehicles at all times

Strictly QoS committed in conjunction with pre-defined maximum delay for safety messages Minimum of transmission power to avoid interference Guaranteeing maximum privacy and anonymity of roaming users Supporting one-way, two-way, point-to-point, point-to-multipoint and multi-hop (e.g., vehicle-to-vehicle) communication Transmission mode: event-driven, periodic Requiring maximum range of communication (more than 100 ms, max 300 ms)

A loss of lives and economical damage attributable to a traffic accident which may occur due to the physical characteristics of a vehicle and a road can be reduced by supporting a V2X application over V2X safety based on V2X communication that satisfies such requirements. In contrast, unlike in a conventional technology, there is a new challenge and vulnerable problem for the communication and security of a vehicle. For example, a specific vehicle may falsely transmit electronic emergency brake light (EEBL) messages to other surrounding vehicles in order to rapidly run. Furthermore, the contents of a normally transmitted message may be halfway changed by the attack of an attacker. Accordingly, a message authentication scheme is necessary for messages that are transmitted and received in V2X communication. Specific messages may be signed and transmitted so that a receiver can authenticate that the specific messages have been transmitted by an authenticated and trusted ITS-Station and have not been halfway changed.

A problem is that a cryptographically signed message has an identifier, such as a certificate, and thus a privacy issue may occur because personal data of a specific identifier, such as the position or time of common messages such as CAN or DENM, can be traced and predicted through the collection of the personal data if the personal data is connected and the messages are traced for a long time. That is, a path, time, etc. may be traced from the running start of a specific vehicle to the end. The personal data means all pieces of information related to information capable of identifying a specific

TABLE 1

| Parameter | SCOOP@F | C2C-CC | SAE | ETSI | IFAL | CAMP |
|---|---|---|---|---|---|---|
| PC Lifetime | 1 week | 1 week | | not-defined | 12 minutes | 1 week |
| Number of Parallel PCs | 10 | 10 | | not-defined | 2 | 20 |
| PC Lifetime Overlap | Yes | Yes | | not-defined | Yes | |
| Max Reuse Number | after 40000 signatures | | | not-defined | 12 minutes | |
| PC Pool Size | 260 | 1040 | | not-defined | 2 | |
| PC Certificate Tank | 6 months | 36 months | | not-defined | 10 years | 1 year |
| Rule | ignition After 40000 signatures | Ignition Randomly after 10~30 minutes | Ignition every 5 minutes | not-defined | Location every 10 minutes based on dynamic selection | Rotation every 10 minutes based on dynamic selection-mix-zone approach | person/specific vehicle. Several schemes capable of guaranteeing privacy are not proposed. The greatest characteristic is that a pseudonym certificate (PC) or an authorization ticket (AT), that is, a PKI-based short-term certificate, is used in an ITS system during a short period. However, two improvements are additionally necessary because the PC is used. One is an efficiency problem with the issue of an AT and corresponding AT management within the ITS station. The other is an efficiency problem with message validation upon communication between ITS stations.

In relation to the issue and management of the AT, Table 1 illustrates that how a PC is generated, maintained and managed within an ITS station. FIG. 2 illustrates how a message signed using SCMS or PKI system is authenticated in V2V communication. The aforementioned embodiments show technical solutions regarding that an ITS station has previously issued and had a specific number of ATs and how frequently will a corresponding AT list be used, replaced and reused according to which policy.

In order to authenticate the messages of other ITS stations received by a vehicle that supports V2X communication, a receiver needs to prove the authenticity of message transmitted by transmitters. For example, if all vehicles continue to change their own PCs every 5 minutes based on a criterion described in the NPRM of the United States, a receiver that has received a message that has been signed by a corresponding PC has to authenticate the PC again because the PC has been changed in the situation in which a message transmitted by the same transmitter cannot be unknown. That is, all ITS stations continue to connect to a server through surrounding infrastructure and have to be authenticated or unconditionally trust a PC. Accordingly, if the ITS stations attempt connections to the server of an SCMS/PKI every time, low latency of V2X communication and the effectiveness of a short message may be reduced. If all the ITS stations unconditionally trust a PC, security is reduced. If communication with a certification server is difficult for a reason because an RSE is not present nearby, V2X communication may also become difficult because authentication itself is impossible. As a result, in order to obtain reliability, consistency and privacy, dependency on the latency, complexity and infrastructure of the existing V2X communication is increased. Although authentication is possible, the number of certification messages and the size of a message may suddenly increase in a congestion environment in which many vehicles are in/out within a surrounding DSRC range while the vehicles run or depending on various conditions, such as an increase in the number of messages according to an emergency situation in which vehicles are increased nearby. Accordingly, V2X communication may be delayed or impossible in the situation in which safety-related message/information must be transmitted/received. In order to solve such a problem, a certificate distribution service, such as P2PCD, or a method, such as Certificate Digest, for authenticating a PC issued by an unknown CA without server access has been proposed and applied to the United State or Europe standard, but an additional solution may still be necessary.

The disclosure proposes an adaptive certificate pre-distribution (ACPD) scheme for efficient message validation while maintaining a real-time property in a V2X communication system. The V2X communication system may be referred to as a connected automated vehicle (CAV) system. The disclosure can reduce a load of authentication when safety-related messages are actually transmitted and received in an emergency situation in real time or when messages are exchanged in a congestion environment by proposing a scheme capable of previously and adaptively distributing a short-term-certificate (PC/AT) based on the aforementioned various V2X communication situation.

In the disclosure, an adaptive certificate pre-distribution (ACPD) method may be performed under the following assumptions.

A moving ITS station, such as all ITS-vehicles or a pedestrian station, has its own past path history and predicted path, and its own current location information through a GPS (not necessary for an RSE).

A specific ITS station may have path information up to its own final destination and a corresponding destination through a system, such as navigation, when predicting a predicted path.

In order to improve efficiency of PC authentication for reliable information reception through V2X communication, an ITS station has a PC pool that will be used ahead of a PC in the future previously in addition to a currently used PC (a PC pool size may be different in each system.).

An ITS station is aware of whether to change its own PC using a PC pool based on which method.

Through the basic assumptions, each ITS stations may predict where it will be located in a given time and which PC will be used at that time. The disclosure proposes the following adaptive certificate pre-distribution (ACPD) method using the basic assumptions.

An ITS station checks whether the ITS station and a surrounding situation are a situation suitable for performing an ACPD.

The ACPD of a PC may not be performed in an emergency situation or a situation having a heavy load, such as a congestion situation.

An ITS station generates an ACPD information/message based on target information which may be obtained through various pieces of information (predicted path information and navigation information). The target information may include information, such as location information after a specific time, a PC to be used in a corresponding time, a current time, and time when a PC will be actually used.

An ITS station may transmit generated ACPD information to an ACPD transmitter, and may request the final ACPD broadcaster that will actually process information to transmit the ACPD information.

The role of an ACPD transmitter may be omitted depending on a communication method, a surrounding environment or a policy, and an ITS station that is an ACPD sender may directly transmit ACPD information to an ACPD broadcaster.

The actual authentication of a previously transmitted PC may be performed by an ACPD transmitter or an ACPD broadcaster.

Hereinafter, ACPD operations of an ACPD sender, ACPD transmitter and ACPD broadcaster are described.

FIG. 8 illustrates an ACPD execution method of an ACPD sender according to an embodiment of the disclosure.

An ACPD sender indicates an ITS station that generates ACPD information for an ACPD.

The ACPD sender may check whether a situation within a current communication range is a situation in which an ACPD operation can be initiated (S8010). The ACPD sender may check whether the situation is a situation in which an ACPD information/message can be transmitted based on whether the situation is an urgent situation or a congestion situation.

The ACPD sender may predict a predicted path to pass in a given time (S8020). In an embodiment, the ACPD sender may predict a predicted path after a PC change.

The ACPD sender may generate target information (S8030). The target information may include at least one of target time information, target location information, or a target certificate.

The ACPD sender may transmit the target information to an ACPD transmitter (S8040). The target information corresponds to an ACPD information/message or may be included in an ACPD information/message.

FIG. 9 illustrates an ACPD execution method of an ACPD transmitter according to an embodiment of the disclosure.

The ACPD transmitter is an ITS station within the communication range of an ACPD sender, and may correspond to an RSU. The ACPD transmitter may transmit ACPD information to an ACPD broadcaster at a target location to which a PC needs to be transmitted for an ACPD.

The ACPD transmitter may check whether the received message is an ACPD message or target information (S9010).

The ACPD transmitter may perform PC authentication based on the target information included in ACPD information (S9020).

If the PC authentication is successful (S9030), the ACPD transmitter may transmit ACPD information to an ACPD broadcaster located at a predicted location (S9040). The ACPD information transmitted to the ACPD broadcaster may include an authenticated PC.

FIG. 10 illustrates an ACPD execution method of an ACPD broadcaster according to an embodiment of the disclosure.

The ACPD broadcaster is an ITS station which is closest to an area to which a PC will be transmitted or which can best transmit a message to a corresponding area, and may correspond to an RSU. That is, the ACPD broadcaster may be at least one RSU that covers the predicted location of a V2X transmission apparatus, that is, an ACPD transmitter, as a communication range.

The ACPD broadcaster may check whether a received message is an ACPD message (S10010).

The ACPD broadcaster may collect an authenticated predicted PC by receiving an ACPD (S10020).

The ACPD broadcaster may collect certificates having a similar PC broadcasting time and wait until proper timing (S10030).

The ACPD broadcaster may broadcast, to surrounding ITS stations, a message including information for an ACPD (S10040).

The operation of FIG. 9 and the operation of FIG. 10 may be continuously performed in a V2X apparatus. That is, a plurality of RSUs may be connected. Such operations of the RSUs may be controlled by a single control system. That is, an ACPD transmitter and an ACPD broadcaster may correspond to a single V2X communication device. In this case, the single control system is a V2X apparatus, and may control a plurality of RSUs. FIGS. 9 and 10 have been described in separate sequences from the viewpoint of an RSU. However, a system that controls an RSU may be referred to as one V2X communication device including a plurality of RSUs. In such a case, a V2X communication device corresponding to an RSU control system may continuously perform the operations of FIGS. 9 and 10.

In the case of the aforementioned ACPD method, ITS stations can secure performance of safe the V2X communication and achieve a reduction of a channel load using a certificate digest by receiving previously forwarded certificates from an ACPD broadcaster. In this case, if the prediction of a location/time for a vehicle is not correct, the waste of performance and a channel may occur due to the inaccuracy of certificate authentication and ACPD information. Hereinafter, what a vehicle arrives within a predicted time along a predicted path is called an ACPD hit rate. There is proposed an effective ACPD method for an ACPD to efficiently operate without the waste of performance and a memory by increasing the hit rate.

FIG. 11 illustrates a process of performing an ACPD according to an embodiment of the present disclosure.

In FIG. 11, a first vehicle 11010 forwards a predicted certificate to an RSU-0. The RSU-0 transmits the certificate to an RSU-3. Furthermore, when the first vehicle 11010 arrives at the coverage of the RSU-3 at a predicted time, the first vehicle may successfully receive a pre-authenticated certificate. In the embodiment of FIG. 11, likewise, a second vehicle 11020 and a third vehicle 11030 may transmit certificates, may arrive at the coverage of the RSU-3 at predicted times, and may receive pre-authenticated certificates.

FIG. 12 illustrates a process of performing an ACPD according to another embodiment of the present disclosure.

In FIG. 12, a first vehicle 12010 and a third vehicle 12030 may arrive at the coverage of an RSU-3 at predicted times, and may receive pre-authenticated certificates. However, a second vehicle 12020 changes a path. Accordingly, the RSU-3 transmits an unnecessary pre-authenticated certificate.

FIG. 13 illustrates a process of performing an ACPD according to another embodiment of the present disclosure.

In FIG. 13, a first vehicle 13010 and a third vehicle 13030 may arrive at the coverage of an RSU-3 at predicted times, and may receive pre-authenticated certificates. However, a second vehicle 13020 does not arrive at the coverage of the RSU-3 at a predicted time. Accordingly, the RSU-3 transmits an unnecessary pre-authenticated certificate.

Hereinafter, a method of solving the aforementioned situation and more efficiently performing an ACPD is described. In the present disclosure, if a problem attributable to a path change or arrival time change is solved and an ACPD is performed, this may be denoted as an effective ACPD (EACPD).

An effective adaptive certificate pre-distribution (EACPD) method of the present disclosure may be performed on the following assumptions.

A moving ITS station, such as all ITS-vehicles and pedestrian stations, has its own past path history and predicted path, and its own current location information through GPSs (not necessary for an RSE).

A specific ITS station may have its own final destination and path information up to the corresponding destination through a system, such as a navigator, when predicting a predicted path.

In order to improve efficiency of PC authentication for reliable information reception through V2X communication, an ITS station has a PC pool to be used in the future in addition to a PC that is now used (PC full size may be different for each system).

An ITS station knows whether to change its own PC using a PC pool according to which method.

Through the above basic assumption, each ITS station may previously predict where it will be located after a given time and which PC will be used at that time. The present disclosure defines additional modes of an ACPD sender and an ACPD broadcaster and proposes the following effective adaptive certificate pre-distribution (EACPD) method based on the prediction.

1. Operation Mode of ACPD Sender
(1) Basic ACPD Mode

In the basic mode, an ACDP sender only issues an ACPD, but does not perform an additional operation, such as cancellation/correction, on an already forwarded ACPD. The reason for this is that a transmitted certificate is deleted after a lapse of effective duration of the certificate although the corresponding certificate is not hit because duration of a PC is short.

(2) Change Notification ACPD Mode

In the change notification mode, if an ACPD sender issues an ACPD and then changes a path, the ACPD sender transmits an additional message for cancelling the corresponding ACPD. Accordingly, an ACPD broadcaster may broadcast an ACPD by excluding an useless ACPD in an ACPDG.

(3) Change Forward ACPD Mode

In the change forward mode, an ACPD sender does not perform cancellation. In this case, the ACPD sender may transmit an ACPD again by additionally considering a path or time in a situation in which the ACPD can be transmitted upon transmission.

(4) Change Notification and Forward ACPD (Change Noti & Forward ACPD) Mode

The change notification and forward mode is a mode in which the aforementioned change notification and change forward are performed together. For example, when a path is changed, an ACPD sender may transmit cancellation information, and may additionally transmit an effective ACPD to an RSU in the changed path.

2. Operation Mode of ACPD Broadcaster
(1) Basic ACPDG Broadcasting Mode

In the basic mode, an ACPD broadcaster may operate in accordance with the basic mode of an ACPD sender. That is, since additional information is not received from a sender, in the case of a no-hit use case, the ACPD broadcaster broadcasts an ACPDG including an unnecessary certificate. An ACPD whose effective duration has elapsed is automatically deleted from the ACPDG.

If the ACPD sender supports the change notification ACPD mode, the ACPD broadcaster may receive cancellation information and perform ACPD deletion. The ACPD deletion may be performed as follows.

The ACPD sender may transmit an ACPD to the ACPD broadcaster through an ACPD transmitter. The ACPD sender may directly transmit the ACPD to the ACPD broadcaster without the intervention of the ACPD transmitter. The ACPD broadcaster configures an ACPDG based on information received from a plurality of ACPD senders. If the path of the ACPD sender is changed and an effective time when the ACPD broadcaster will broadcast the ACPDG does not elapse or effective duration has not elapsed, the ACPD sender may transmit, to the ACPD broadcaster, a Cancel ACPD for deleting the corresponding ACPD. The ACPD broadcaster checks whether a Cancel ACPD is present from the generated ACPDG. If the Cancel ACPD is included in the ACPDG, the ACPD broadcaster may delete the Cancel ACPD from an ACPDG list. The ACPD broadcaster may make an ACPD list from which an unnecessary ACPD has been deleted, and can increase a hit rate by broadcasting the ACPDG based on the ACPD list. The automatic deletion of an already passed ITS-S may also be supported depending on a deletion procedure.

(2) Self Add/Delete Mode

The self add/delete mode of a PC for an ACPDG is a function for configuring an ACPDG. Add is a function for adding a PC for non-ACPD ITS-Ss that have not transmitted an ACPD within its own communication area in addition to an ACPD transmitted by an ACPD sender so that the PC and the ACPD can be used in an ACPDG configuration. The non-APCD ITS-S that has not transmitted an ACPD means an ITS-S that has not been prepared to transmit an ACPD for a reason, such as emergency, or that does not support an ACPD. Delete means a function for receiving a Cancel ACPD from an ACPD sender and deleting a corresponding PC from an ACPDG. Accordingly, an ACPD hit rate can be improved, and an effect of using an ACPDG can be enhanced. A detailed description of the add/delete function is as follows.

(2-1) Addition Procedure

While processing an n-th ACPDG, an ACPD broadcaster obtains a full PC of non-ACPDs through V2I communication with non-ACPD ITS-Ss within the communication area of the ACPD broadcaster. The ACPD broadcaster selects a PC having an overlapped time by comparing effective duration of a corresponding PC among non-ACPD ITS-Ss owned by the ACPD broadcaster with effective time and duration of the n-th ACPDG. The ACPD broadcaster selects only PCs having a possibility that a PC will be received within effective start time and duration of the PC of an n-th ACPDG by considering the speed and communication range of the ACPD broadcaster in a non-ACPD list, and may add the selected PCs to the ACPDG. For example, a vehicle may be stopped while waiting a signal only in the left-turn lane of the ACPD broadcaster, and the speed may be 0. After 5 minutes, the effective start time of an n-th PC may be started, and thus target vehicle arrival may be predicted. In this case the ACPD broadcaster may include full PCs of vehicles waiting for a left turn in the ACPDG, and may broadcast the ACPDG after 5 minutes.

(3) Self-Forwarding Mode

In the self forwarding mode for a PC of an ACPDG, if effective duration of an ACPD remains and the direction/path of a mobile ITS-S is confirmed, an ACPD broadcaster may perform 121 ACPDG forwarding for the corresponding ACPD. That is, the ACPD broadcaster in addition to an ACPD sender may forward a full PC list predicted for another ACPD broadcaster⁰|| using 121 communication. The ACPD broadcaster may perform forwarding using information, such as the speed, direction and path prediction of ITS-Ss within its own communication range.

Table 2 illustrates an embodiment in which a PC digest is used using ACPD target information (ATI), used when an ACPD sender transmits an ACPD to an ACPD transmitter or an ACPD broadcaster, as an identifier as below. In the case of an Add function, a full PC must be present. In the case of a Delete function 우, as in Table 3, the size of a payload can be reduced by omitting a full PC and using only an authentication digest. The Add/delete function may be inserted as ATI as in Table 2 and Table 3 and may be added as the payload of an SPDU. Alternatively, AcpdSend may be added in header information in a HashId+ACPD Send Function form not HashID as header information of an SPDU, and may be inserted into both Payload and Header Info structures. In this case, this may be represented like Table 4 using the ACPD sender mode without any changed instead of the function. If the change notification and forward mode or the notification mode is used, an ACPD broadcaster to be cancelled may be aware by providing the location where an ACPD was previously transmitted using the former location.

Table 2 illustrates an example of ACPD target information supporting the ADD function.

TABLE 2

| Descriptive name | ACPD target information |
| --- | --- |
| Function | Add |
| Identifier | Pseudonym Certificate Digest (PC digest) |
| Certificate | Pseudonym Certificate (PC) |
| Effective time | Time information which the PC will be active |
| Duration | Duration Information from effective time |
| Predicted location | Predicted location to use the PC |

Table 3 illustrates an example of ACPD target information supporting the Cancel function.

TABLE 3

| Descriptive name | ACPD target information |
| --- | --- |
| Function | Delete |
| Identifier | Pseudonym Certificate Digest (PC digest) |
| Effective time | Time information which the PC will be active |
| Duration | Duration Information from effective time |
| Former location | Predicted location to use the PC |

Table 4 illustrates an example of ACPD target information supporting the Add/Delete function.

TABLE 4

| Descriptive name | ACPD target information |
| --- | --- |
| Mode | ACPD Sender Mode such as Basic/ChangeNoti/ChangeForw/ChangeNotiForw |
| Identifier | Pseudonym Certificate Digest (PC digest) |
| Certificate | Pseudonym Certificate (PC)- optional |
| Effective time | Time information which the PC will be active |
| Duration | Duration Information from effective time |
| Predicted location | Predicted location to use PC |
| Former location | Former location -(optional) |

Table 5 and Table 6 illustrate ACPD Broadcasting Information (ABI) used as an ACPD broadcasting message. An ACPD broadcaster may collect target information received from an ACPD sender or transmitter, may select PCs having the same effective time, and may broadcast trusted PC information as an ACPD broadcasting message for specific duration at an effective time.

In an embodiment, if PCs in which the effective time of an ATI is from PM 4:00 to PM 4:10 are collected and start to be broadcasted at PM 3:55, the effective time of an ABI may be PM 3:55. When duration of an ACPD in an ATI list is ended, an ACPD broadcaster may delete ACPD information whose duration has ended from the ABI list, and may perform an addition operation for ACPD broadcasting for next duration (e.g., PM 4:10~4:20). That is, the ACPD broadcaster may manage the list in real time and broadcast an ACPDG message.

Table 5 illustrates an example of ACPD broadcasting information.

TABLE 5

| Descriptive name | ACPD Broadcasting Information |
| --- | --- |
| Effective Time | Effective Time |
| Num of ACPD info | Num of ACPD info |
|  | ACPD information list |

Table 6 illustrates an example of ACPD group (ACPDG) broadcasting information.

TABLE 6

| Descriptive name | ACPD broadcasting information |
| --- | --- |
| Mode | ACPD Sender Mode, such as Basic/ChangeNoti/ChangeForw/ChangeNotiForw |
| Identifier | Pseudonym Certificate Digest (PC digest) |
| Certificate | Pseudonym Certificate (PC) |
| Effective time | Time information which the PC will be active |
| Duration | Duration Information from effective time |

Table 7 illustrates basic ACPD target information transmitted from an ACPD sender to an ACPD transmitter or an ACPD broadcaster.

TABLE 7

| Descriptive name | ACPD target information |
| --- | --- |
| Identifier | PC |
| Time information/timestamp | May indicate a generation timestamp, ACPD target information or generation time of a PC |
| Effective time | Time information which the PC will be active |
| Predicted location | Predicted location where the PC will be used |

FIG. 14 illustrates an operation of an ACPD sender in the basic ACPD mode according to an embodiment of the present disclosure.

S14010: the ACPD sender checks whether an ACPD is appropriate to be transmitted and sets an ACPD sender mode based on a situation. In the case of the basic mode, the ACPD sender may transmit an ACPD for ADD to an ACPD transmitter or an ACPD broadcaster in a given cycle.

S14020: if the ACPD passes through the ACPD transmitter, the ACPD transmitter transmits the ACPD to the ACPD broadcaster based on location information of the ACPD.

S14030: the ACPD broadcaster may configure an ACPDG by processing ACPD messages received from a plurality of ACPD senders through pre-processing. The ACPD broadcaster configures the ACPDG by sorting the ACPD messages based on an effective time, and verifies the validation of certificates within the ACPDG, including a PKI that has issued the certificate.

S14040: when the effective time is reached, the ACPD broadcaster broadcasts the prepared ACPDG for ACPD duration.

S14050: the ACPD broadcaster deletes an ACPD whose ACPD duration has expired, and performs ACPD information list management within the ACPDG, such as adding an ACPD whose effective time newly arrives.

FIG. 15 illustrates an operation of an ACPD sender in the change notification mode according to an embodiment of the present disclosure.

S15010: the ACPD sender checks whether an ACPD is appropriate to be transmitted and sets an ACPD sender mode based on a situation. In the case of the basic mode, the ACPD sender may transmit an ACPD for ADD to an ACPD transmitter or an ACPD broadcaster in a given cycle. However, in the case of the change notification mode, the ACPD sender may transmit an ACPD in addition to a given cycle based on a predicted arrival time change or path change.

S15020: if the ACPD passes through the ACPD transmitter, the ACPD transmitter transmits the ACPD to the ACPD broadcaster based on location information of the ACPD.

S15030: the ACPD broadcaster may configure an ACPDG by processing ACPD messages received from a plurality of ACPD senders through pre-processing. The ACPD broadcaster configures the ACPDG by sorting the ACPD messages based on an effective time, and verifies the validation of certificates within the ACPDG, including a PKI that has issued the certificate.

S15040: if the path of the ACPD sender is changed, the ACPD sender transmits ACPD target information for cancellation, that is, a CAPCD, to the ACPD transmitter again. An ACPD transmitter that has first received the ACPD target information and an ACPD transmitter that has first received CACPD target information may be the same or different.

S15050: the ACPD transmitter transmits the CAPCD to the ACPD broadcaster based on location information of the CACPD.

S15060: the ACPD broadcaster that has received the CACPD deletes, from the ACPDG message, ACPD information having the same ACPD digest (identifier) information in the ACPDG that has been configured/to be configured.

S15070: when the effective time is reached, the ACPD broadcaster broadcasts a prepared ACPDG message for ACPD duration.

S15080: the ACPD broadcaster deletes an ACPD whose ACPD duration has expired, and performs ACPD information list management within the ACPDG, such as adding an ACPD whose effective time newly arrives.

FIG. 16 illustrates an operation of an ACPD sender in the change forward mode according to an embodiment of the present disclosure.

S16010: the ACPD sender checks whether an ACPD is appropriate to be transmitted and sets an ACPD sender mode based on a situation. If a transmission cycle/condition based on the selected mode is satisfied, the ACPD sender may transmit a message for adding the ACPD.

S16020: if the ACPD passes through an ACPD transmitter, the ACPD transmitter transmits the ACPD to an ACPD broadcaster based on location information of the ACPD.

S16030: a first ACPD broadcaster may configure an ACPDG by processing ACPD messages received from a plurality of ACPD senders through pre-processing. The first ACPD broadcaster configures the ACPDG by sorting the ACPD messages based on an effective time, and verifies the validation of certificates within the ACPDG, including a PKI that has issued the certificate.

S16040: if the path of the ACPD sender is changed, the ACPD sender may newly generate and transmit an ACPD based on location and time information of the changed path. An ACPD transmitter that has first received the ACPD target information and an ACPD transmitter that has first received CACPD target information may be the same or different.

S16050: a second ACPD broadcaster may configure an ACPDG by processing ACPD messages received from a plurality of ACPD senders through pre-processing. The second ACPD broadcaster configures the ACPDG by sorting the ACPD messages based on an effective time, and verifies the validation of certificates within the ACPDG, including a PKI that has issued the certificate.

S16060: when the effective time is reached, the first ACPD broadcaster broadcasts a prepared ACPDG message for ACPD duration. In this case, an ACPDG message including an unnecessary certificate of the ACPD sender is broadcasted, and no hit occurs.

S16070: when the effective time is reached, the second ACPD broadcaster broadcasts a prepared ACPDG message for ACPD duration. In this case, an ACPDG message including the certificate of the ACPD sender is broadcasted, and a hit occurs.

S16080: the first ACPD broadcaster deletes an ACPD whose ACPD duration has expired, and performs ACPD information list management within the ACPDG, such as adding an ACPD whose effective time newly arrives.

S16080: the second ACPD broadcaster deletes an ACPD whose ACPD duration has expired, and performs ACPD information list management within the ACPDG, such as adding an ACPD whose effective time newly arrives.

FIG. 17 illustrates an operation of an ACPD sender in the change notification and forward mode according to an embodiment of the present disclosure.

S17010: the ACPD sender checks whether an ACPD is appropriate to be transmitted and sets an ACPD sender mode based on a situation. If a transmission cycle/condition based on the selected mode is satisfied, the ACPD sender may transmit a message for adding the ACPD.

S17020: if the ACPD passes through an ACPD transmitter, the ACPD transmitter transmits the ACPD to an ACPD broadcaster based on location information of the ACPD.

S17030: a first ACPD broadcaster may configure an ACPDG by processing ACPD messages received from a plurality of ACPD senders through pre-processing. The first ACPD broadcaster configures the ACPDG by sorting the ACPD messages based on an effective time, and verifies the validation of certificates within the ACPDG, including a PKI that has issued the certificate.

S17040: if the path of the ACPD sender is changed, the ACPD sender transmits ACPD target information for cancellation, that is, a CAPCD, to the ACPD transmitter again. An ACPD transmitter that has first received the ACPD target information and an ACPD transmitter that has first received CACPD target information may be the same or different. Furthermore, if the path of the ACPD sender is changed, the ACPD sender may newly generate and transmit the ACPD based on location and time information for the changed path. An ACPD transmitter that has first received the ACPD target information and an ACPD transmitter that has first received CACPD target information may be the same or different.

S17050: the ACPD transmitter transmits the CAPCD to the ACPD broadcaster based on location information of the CACPD.

S17060: the ACPD transmitter transmits the APCD to an ACPD broadcaster based on location information of the new ACPD.

S17070: the first ACPD broadcaster that has received the CACPD deletes, from the ACPDG message, matched ACPD information having the same ACPD digest (identifier) information in the ACPDG that has been configured/to be configured. When the effective time is reached, the first ACPD broadcaster broadcasts a prepared ACPDG message for ACPD duration.

S17080: the first ACPD broadcaster deletes an ACPD whose ACPD duration has expired, and performs ACPD information list management within the ACPDG, such as adding an ACPD whose effective time newly arrives.

S17090: S16050: the second ACPD broadcaster may configure an ACPDG by processing ACPD messages received from a plurality of ACPD senders through pre-processing. The second ACPD broadcaster configures the ACPDG by sorting the ACPD messages based on an effective time, and verifies the validation of certificates within the ACPDG, including a PKI that has issued the certificate.

S17100: the second ACPD broadcaster broadcasts a prepared ACPDG message for ACPD duration. In this case, an ACPDG message including the certificate of the ACPD sender is broadcasted, and a hit occurs.

S17110: the second ACPD broadcaster deletes an ACPD whose ACPD duration has expired, and performs ACPD information list management within the ACPDG, such as adding an ACPD whose effective time newly arrives.

FIG. 18 illustrates a comparison between the sizes of certificates according to an embodiment of the present disclosure.

FIG. 18(a) illustrates an embodiment if a full certificate is used. FIG. 18(b) illustrates an embodiment if a certificate digest is used.

In an embodiment, according to the Europe standard, in the size of a security field, a certificate (AT) may correspond to 140 bytes, a certificate digest may correspond to 10 bytes, a signature may correspond to 69 bytes, and a header field may correspond to a variable. That is, if the size of a CAM message is 500 bytes, in the case of FIG. 18(a), a ratio of information for security is $2/5$ or more. However, in the case of the certificate digest, the size is greatly reduced to $1/14$. Accordingly, in using an ACPD of the present disclosure, a hit rate can be increased, and a burden of security communication can be greatly reduced using the certificate digest not the full PC.

FIG. 19 illustrates ITS reference architecture for providing ACPD service according to an embodiment of the present disclosure.

The facility layer (Facilities) of an ACPD sender may configure a message, including target information, through message processing such as CAM/DANM or Basic Information Message (BIM), and may forward the message to a networking & transport layer.

An ACPD transmitter that has received the message may transmit the target information to an ACPD broadcaster. The ACPD broadcaster that has received the target information may broadcast, to its own area, PCs, pre-authenticated based on timing at which a PC is effective, at proper timing.

FIG. 20 illustrates a WAVE protocol stack to which an ACPD entity for providing ACPD service has been added according to an embodiment of the present disclosure.

In FIG. 20, an adaptive certificate pre-distribution (APCD) entity has been added to the aforementioned WAVE protocol stack. The ACPD entity, as described above, may perform ACPD operations, such as the transmission of ACPD information, the pre-authentication of a PC and the broadcasting of ACPD information/PC.

FIG. 21 illustrates a use example of an ITS-S in which an ACPD/ACPDG is supported according to an embodiment of the present disclosure.

In FIG. 21, all of a first vehicle 21010, a second vehicle 21020 and a third vehicle 21030 supports an ACPD, and transmit ACPDs to an RUS0, an RSU1, and an RSU2, respectively. The RSUs may be interconnected in a wired/wireless manner. In particular, in the case of a wired connection, the RSUs may be always connected to a system, such as a TMC or a PKI. Accordingly, the RSUs can communicate with vehicles that have arrived at predicted times without delay, without an additional communication load of the RSU or delay according to wireless communication.

FIG. 22 illustrates another use example of an ITS-S in which an ACPD/ACPDG is supported according to an embodiment of the present disclosure.

In FIG. 22, vehicles can rapidly move as predicted. Accordingly, a corresponding area may not be covered by a cyclic ACPD. In such a case, if an RSU determines that forwarding to a next RSU is necessary, it may perform the corresponding forwarding using 121.

FIG. 23 illustrates another use example of an ITS-S in which an ACPD/ACPDG is supported according to an embodiment of the present disclosure.

In FIG. 23, in the case of a vehicle that does not support an ACPD or that has not previously transmitted an ACPD due to a traffic situation, an RSU may perform authentication by exchanging a full certificate with the corresponding vehicle and perform verification with a PKI. In this case, the RSU transmits an ACPDG including certificates that need to be transmitted, thereby being capable of improving communication efficiency.

FIG. 24 illustrates a method of transmitting ACPD information according to an embodiment of the present disclosure.

FIG. 24 illustrates a signed type SPDU including ACPD target information for forwarding, by an ACPD sender, ACPD information to be used in the future to a surrounding ACPD transmitter or ACPD broadcaster. In an embodiment, FIG. 24 may illustrate an SPDU including ACPD target information based on the IEEE 1609.2 standard. The ACPD transmitter may transmit a signed SPDU. The signed SPDU may include a PC to be used in the future.

The ACPD sender may configure the SPDU including a payload 2402 and a header. The payload may be the ACPD target information. A field (appSend) 2401 indicating ACPD transmission may be optionally added to the header information. A description of fields included in the header is as follows.

PSID: a service provider ID. A new PSID value for an ACPD/ACPDG may be assigned to the service provider ID.
 generationTime: a message generation time
 expiryTime: a message expiry time
 generationLocation: message generation area information. In an embodiment, a receiver may use this to exclude a message in a too far area.
 P2PCDrequest: an ID used upon peer-to-peer learning request and an ID value for handling multiple requests
 MissingCrlIdentifier: used upon transmission in order to identify a missing CLR.
 EncryptionKey: encryption/encryption keys
 acpdSend: applied to handle multiple requests when an ACPD sender transmits ATI information.

If payload and header information are configuration, as in (1) of FIG. 24, data to be signed (ToBeSignedData) 2403 is configured. In an embodiment, as in (2), data to be signed may be included as part of signed data (SignedData) of IEEE 1609.2. Furthermore, the data may be used as input data for making a signature.

In (3), a signature/sign may be generated through a hash and a sign/signature. A message, such as BSM, is generated using a PC that is now used. In the present disclosure, however, a hash and a sign are performed using a PC to be used in the future, which is transmitted as an ACPD. The reason why such an operation is performed is that if the future PC and current PC of a payload are transmitted at a time, other ITS stations can track a corresponding ITS station because relevance between certificates is exposed, and thus a privacy issue may occur.

A hash and sign may be performed like signing and verification using common asymmetric cryptography. That is, an ACPD sender puts data to be transmitted as input to a predetermined hash function, and obtains a hash value, that is the results of output. Furthermore, the ACPD sender generates a signature using an electronic sign algorithm based on a hash value and its own private key.

As a result, if an SPDU is configured as described above, a receiver that has received the final SPDU generated by the ACPD sender obtains a hash value by performing computation using parsed ToBeSignedData as input to the same hash function. Furthermore, the receiver may perform validation, such as intermediate falsification of a message, using the obtained hash value, the received signature and the public key of the ACPD sender.

In (4) of FIG. 24, when receiving the corresponding message, the transmission side adds HashIdentifier to ToBeSignedData in order to notify that which hash algorithm has been used, and adds information (SignerInfo) and signature of a signer behind ToBeSignedData, that is, a payload. When the final signedData is generated as described above, version information and type information are added as a header to generate transmission data.

A description of fields included in the signed data is as follows.

HashAlgorithm: a hash algorithm field illustrates a Hash algorithm used to sign and verify a message.

ToBeSignedData is data to be actually transmitted, and is personal data of the HASH function for a signature.

SignerIdentifier: the signer identifier illustrates that which key material has been used for message authentication. The signer identifier may indicate any one of a digest, a certificate or self. The digest is a case where Certi.Digest is used, and is used when a counterpart already has a full certificate. Certivicate is selected when a full certificate is used. Self is selected if it is self itself.

Signature: Electronic Sign/Signature

FIG. 25 illustrates a method of transmitting ACPD information according to another embodiment of the present disclosure.

FIG. 25 is the same as FIG. 24, but corresponds to a case where an RSU performs broadcasting to another ITS station. Accordingly, there is no privacy issue, and a future certificate does not need to be used as in FIG. 25. Furthermore, a payload including the aforementioned ACPD broadcasting information (ABI) may be transmitted.

FIG. 26 illustrates ACPD content transmitted by an ACPD sender and an ACPD message transmitted by an ACPD broadcaster according to an embodiment of the present disclosure.

FIG. 26(a) illustrates ATI, that is, the payload of the message described in FIG. 24. FIG. 26(b) illustrates ABI, that is, the payload of the message described in FIG. 25. Information of Table 6 may be included in the ABI from a list 1 of ACPD information. In Table 6, mode information is a mode of an ACPD broadcaster not an ACPD sender, and may indicate whether a corresponding ACPD is included in an ACPDG message according to which mode.

FIG. 27 illustrates a V2X communication device according to an embodiment of the present disclosure.

In FIG. 27, the V2X communication device 27000 may include a communication unit 27010, a processor 27020 and a memory 27030. As described above, the V2X communication device may correspond to an on board unit (OBU) or a road side unit (RSU) or may be included in an OBU or RSU. The V2X communication apparatus may be included in an ITS station or may correspond to an ITS station.

The communication unit 27010 is connected to the processor 27020 and may transmit/receive a wireless/wired signal. The communication unit 27010 may up-convert data, received from the processor 27020, into a transmission or reception band, and may transmit a signal. The communication unit 27010 may implement an operation of the access layer. In an embodiment, the communication unit 27010 may implement an operation of the physical layer included in the access layer or may additionally implement an operation of the MAC layer. The communication unit 27010 may include a plurality of sub-RF units in order perform communication according to a plurality of communication protocols.

The processor 27020 is connected to the communication unit 27010 and may implement operations of layers according to an ITS system or a WAVE system. The processor 27020 may be configured to perform operations according to the aforementioned various embodiments of the disclosure according to the drawings and description. Furthermore, at least one of a module, data, a program or software that implements an operation of the V2X communication apparatus 27000 according to the aforementioned various embodiments of the disclosure may be stored in the memory 27030 and executed by the processor 27020.

The memory 27030 is connecter to the processor 27020 and stores various pieces of information for driving the processor 27020. The memory 27030 is installed inside the processor 27020 or outside the processor 27020, and may be connected to the processor 27020 by known means. The memory may include a security/non-security storage device or may be included in a security/non-security storage device. In some embodiments, the memory may be referred to as a security/non-security storage device.

A detailed configuration of the V2X communication apparatus 27000 in FIG. 27 may be implemented so that various embodiments of the disclosure are independently applied or two or more of the embodiments are applied together.

The V2X communication device 27000 may perform a secured communication method as described above. The secured communication method of the V2X communication device/processor is described below again. In FIG. 27, the V2X communication device may correspond to an RSU/RSU system or an infrastructure/infrastructure system.

FIG. 28 is a flowchart illustrating a secured communication method according to an embodiment of the present disclosure.

A V2X communication device may receive at least one message based on V2X communication (S28010). The V2X message may be a message transmitted from a vehicle to a RSU.

The V2X communication device may extract the ACPD target information based on the message including adaptive certificate pre-distribution (ACPD) target information (S28020). The ACPD target information may include at least one of a short-term certificate, time information indicating the generation time of the ACPD target information, effective time information of the short-term certificate, information on a predicted location where the short-term certificate will be used, and information on a predicted time when the short-term certificate will be used. In an embodiment, the ACPDG target information may be configured like Table 7.

The V2X communication device may pre-authenticate the short-term certificate obtained from the ACPD target information (S28030).

The V2X communication device may collect at least one pre-authenticated short-term certificate to be broadcasted at a predicted location on a specific time (S28040). The V2X communication device may configure an ACPDG message including short-term certificates to be broadcasted at the same location on the same time. In an embodiment, the ACPDG message may be configured like Table 6.

The V2X communication device may transmit an ACPDG at a predicted location on a broadcasting time (S28050). The V2X communication device may transmit the ACPDG using an RSU having communication coverage to cover a location where an ACPD sender will arrive at a time when the ACPD sender performs transmission. In an embodiment, an operation of transmitting the short-term certificate of the V2X communication device so that the short-term certificate is broadcasted at a predicted location may further include the step of transmitting the short-term certificate to a communication unit or V2X communication device having a communication range to cover the predicted location.

The short-term certificate may be a short-term certificate used for current message communication and a short-term certificate to be used at timing at which another piece of predicted time information is indicated. Furthermore, the ACPD broadcasting message may include at least one of at least one pre-authenticated short-term certificate, duration information indicating message broadcast duration, or effective time information. The short-term certificate may correspond to a pseudonym certificate (PC) or an authorization ticket (AT).

As described in Table 2, the ACPD target information may further include additional information for a short-term certificate addition. In Table 2, information indicating the Add function may correspond to additional information. In this case, the additional information may include at least one of the pieces of information necessary for the short-term certificate addition, which are included in Table 2. If the ACPD target information includes the additional information, the V2X communication device may add the short-term certificate of the ACPD target information to the ACPDG message by authenticating the short-term certificate based on effective time information and predicted location information of the ACPD target information.

As described in Table 3, the ACPD target information may further include cancellation information for short-term certificate deletion. In Table 3, information indicating the Cancel function may correspond to cancellation information. In this case, the cancellation information may include at least one of the pieces of information necessary for the short-term certificate addition, which are included in Table 3. If the ACPD target information includes the cancellation information, the V2X communication device may delete the short-term certificate of the ACPD target information from the ACPDG message based on effective time information and predicted location information of the ACPD target information.

As described in Table 4, the ACPD target information may further include mode information indicating an operation mode of an ACPD sender. The mode information indicates an operation mode based on a path change or predicted arrival time change of an ACPD transmitter. As described above, the mode information may indicate at least one of (1) the basic ACPD mode, (2) the change notification ACPD mode, (3) the change forward ACPD mode, or (4) the Change Noti & Forward ACPD mode.

According to the present disclosure, when V2V message communication is performed, the ratio of certificate digest authentication among full certificate authentication and certificate digest authentication through a hash value can be increased. If the ratio of the certificate digest authentication is high, low latency can be guaranteed, and a channel load can be reduced because the size of messages is reduced although the number of messages is the same. According to the present disclosure, if an RSU broadcasts a message, a memory necessary for an RSU may be increased, but a channel load can be reduced compared to a case where ITS-Ss within a communication range perform mutual authentications. The RSU memory may be smartly optimized and managed based on the operation of a cancellation ACPD message mode by an ACPD sender or an automatic deletion mode by an ACPD broadcaster. Furthermore, an effect of an ACPD proposed by the present disclosure can be doubled because a hit rate is increased through retransmission based on the path and time elapse of the ACPD.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

MODE FOR INVENTION

Those skilled in the art will understand that the present invention may be changed and modified in various ways without departing from the spirit or range of the present invention. Accordingly, the present invention is intended to include all the changes and modifications provided by the appended claims and equivalents thereof.

In this disclosure, both the apparatus and the method have been described, and the descriptions of both the apparatus and method may be complementarily applied.

Various embodiments have been described in Best Mode for Invention.

INDUSTRIAL APPLICABILITY

The disclosure is used in a series of vehicle communication fields.

Those skilled in the art will understand that the present invention may be changed and modified in various ways without departing from the spirit or range of the present invention. Accordingly, the present invention is intended to include all the changes and modifications provided by the appended claims and equivalents thereof.

The invention claimed is:

1. A secured communication method of a vehicle-to-everything (V2X) communication device, comprising:
   receiving at least one first message based on V2X communication;
   pre-authenticating at least one short-term certificate obtained from the at least one first message;
   collecting the at least one pre-authenticated short-term certificate for broadcast at a specific predicted location on a specific predicted time; and
   broadcasting a second message at the specific predicted location on the specific predicted time,
   wherein the V2X communication is DSRC (Dedicated Short-Range Communication),
   wherein the at least one short-term certificate corresponds to a pseudonym certificate (PC) or an authorization ticket (AT),
   wherein the second message includes an adaptive certificate pre-distribution (ACPD) group (ACPDG) message that includes the collected at least one pre-authenticated short-term certificate, and
   wherein broadcasting the second message includes transmitting the second message to a V2X communication device having a communication range to cover the predicted location.

2. The secured communication method of claim 1, further comprising:
   extracting ACPD target information from the at least one first message,
   wherein the ACPD target information includes the at least one short-term certificate, and at least one of:
      time information indicating a generation time of the ACPD target information,
      effective time information of the at least one short-term certificate,
      information on a predicted location where the at least one short-term certificate is to be used, or
      information on a predicted time when the at least one short-term certificate is to be used,
   wherein the ACPD target information further includes additional information for a short-term certificate addition.

3. The secured communication method of claim 2, based on the ACPD target information including the additional information:
   further including adding the at least one short-term certificate of the ACPD target information to the ACPDG based on the effective time information and the predicted location information of the ACPD target information.

4. The secured communication method of claim 1, wherein the ACPD target information further includes cancellation information for a short-term certificate cancellation.

5. The secured communication method of claim 4, based on the ACPD target information including the cancellation information:
   further including deleting the at least one short-term certificate of the ACPD target information from the ACPDG based on the effective time information and the predicted location information of the ACPD target information.

6. The secured communication method of claim 1, wherein the second message includes at least one of duration information indicating message broadcast duration, or effective time information.

7. The secured communication method of claim 1, wherein the ACPD target information further includes mode information indicating an operation mode based on a path change or predicted arrival time change of an ACPD sender.

8. A vehicle-to-everything (V2X) communication device, comprising:
   a memory configured to store data;
   at least one communication unit including a transceiver configured to transmit or receive at least one of a wired signal or a wireless signal; and
   a processor controlling the memory and the communication unit,
   wherein the processor is configured to:
   receive at least one first message based on V2X communication;
   pre-authenticate at least one short-term certificate obtained from the at least one first message;
   collect the at least one pre-authenticated short-term certificate for broadcast at a specific predicted location on a specific predicted time; and
   broadcast a second message at the specific predicted location on the specific predicted time,
   wherein the V2X communication is DSRC (Dedicated Short-Range Communication),
   wherein the at least one short-term certificate corresponds to a pseudonym certificate (PC) or an authorization ticket (AT),
   wherein the second message includes an adaptive certificate pre-distribution (ACPD) group (ACPDG) message that includes the collected at least one pre-authenticated short-term certificate, and
   wherein broadcasting the second message includes transmitting the second message to a V2X communication device having a communication range to cover the predicted location.

9. The V2X communication device of claim 8,
   wherein the processor is further configured to extract ACPD target information from the at least one first message,
   wherein the ACPD target information includes the at least one short-term certificate, and at least one of:
      time information indicating a generation time of the ACPD target information,
      effective time information of the at least one short-term certificate,
      information on a predicted location where the at least one short-term certificate is to be used, or
      information on a predicted time when the at least one short-term certificate is to be used, and
   wherein the ACPD target information further includes additional information for a short-term certificate addition.

10. The V2X communication device of claim 9,
    wherein based on the ACPD target information including the additional information, the at least one short-term certificate of the ACPD target information is added to the ACPDG based on the effective time information and the predicted location information of the ACPD target information.

11. The V2X communication device of claim 8, wherein the ACPD target information further includes cancellation information for a short-term certificate cancellation.

12. The V2X communication device of claim 11, wherein based on the ACPD target information including the cancellation information, the at least one short-term certificate of the ACPD target information is deleted from the ACPDG based on the effective time information and the predicted location information of the ACPD target information.

13. The V2X communication device of claim 9, wherein the second message includes at least one of duration information indicating message broadcast duration, or effective time information.

14. The V2X communication device of claim 9, wherein the ACPD target information further includes mode information indicating an operation mode based on a path change or predicted arrival time change of an ACPD sender.

\* \* \* \* \*